United States Patent
Shimizu

(10) Patent No.: US 9,561,442 B2
(45) Date of Patent: Feb. 7, 2017

(54) STORAGE MEDIUM HAVING IMAGE PROCESSING PROGRAM STORED THEREON AND IMAGE PROCESSING APPARATUS

(75) Inventor: Hideaki Shimizu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1902 days.

(21) Appl. No.: 11/898,109

(22) Filed: Sep. 10, 2007

(65) Prior Publication Data

US 2009/0017907 A1 Jan. 15, 2009

(30) Foreign Application Priority Data

Jul. 9, 2007 (JP) ................................ 2007-180294

(51) Int. Cl.
*A63F 13/00* (2014.01)
*A63F 13/42* (2014.01)
*A63F 13/5258* (2014.01)
*A63F 13/40* (2014.01)

(52) U.S. Cl.
CPC ............... *A63F 13/42* (2014.09); *A63F 13/10* (2013.01); *A63F 13/5258* (2014.09); *A63F 2300/6045* (2013.01); *A63F 2300/646* (2013.01); *A63F 2300/6684* (2013.01)

(58) Field of Classification Search
CPC ............................. A63F 13/10; A63F 13/5258
USPC .......................................................... 463/31
See application file for complete search history.

(56) References Cited

U.S. PATENT DOCUMENTS

| 6,139,433 A | * | 10/2000 | Miyamoto et al. ............. 463/32 |
| 2002/0005849 A1 | | 1/2002 | Tsukizaki |
| 2004/0229669 A1 | * | 11/2004 | Zimmerman .................... 463/1 |
| 2006/0116202 A1 | | 6/2006 | Nakajima |

FOREIGN PATENT DOCUMENTS

| JP | 2002-263359 | 9/2002 |
| JP | 2003-208632 | 7/2003 |
| JP | 2006-149767 | 6/2006 |

OTHER PUBLICATIONS

"Super Mario Galaxy", Famitsu DS plus Wii, Enterbrain, Inc., Dec. 1, 2006, vol. 8, No. 12, p. 40 (partial translation).
Japanese Office Action issued for corresponding Japanese Patent Application No. 2007-180294, dated Nov. 24, 2011.

* cited by examiner

*Primary Examiner* — Milap Shah
*Assistant Examiner* — Thomas H Henry
(74) *Attorney, Agent, or Firm* — Nixon & Vanderhye, P.C.

(57) ABSTRACT

An operation target object in a virtual game space as seen from a virtual camera is displayed on a display device. A moving direction of the operation target object in a virtual space in accordance with a direction represented by direction data based on a direction input by the user is determined based on an exactly upward vector representing a direction of a virtual gravity acting on the position of the operation target object in the virtual space and a direction of the normal in the virtual field at the position. The operation target object is moved in the determined moving direction.

27 Claims, 23 Drawing Sheets

F I G. 4
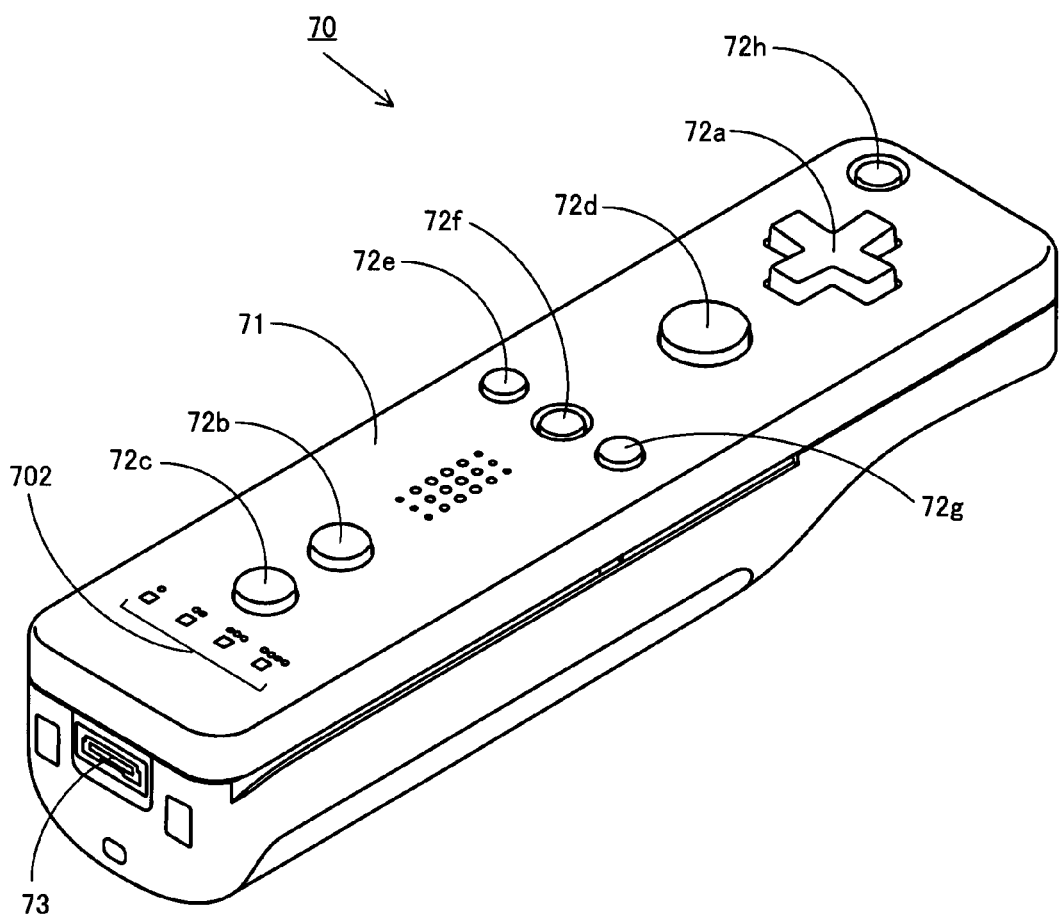

F I G. 9
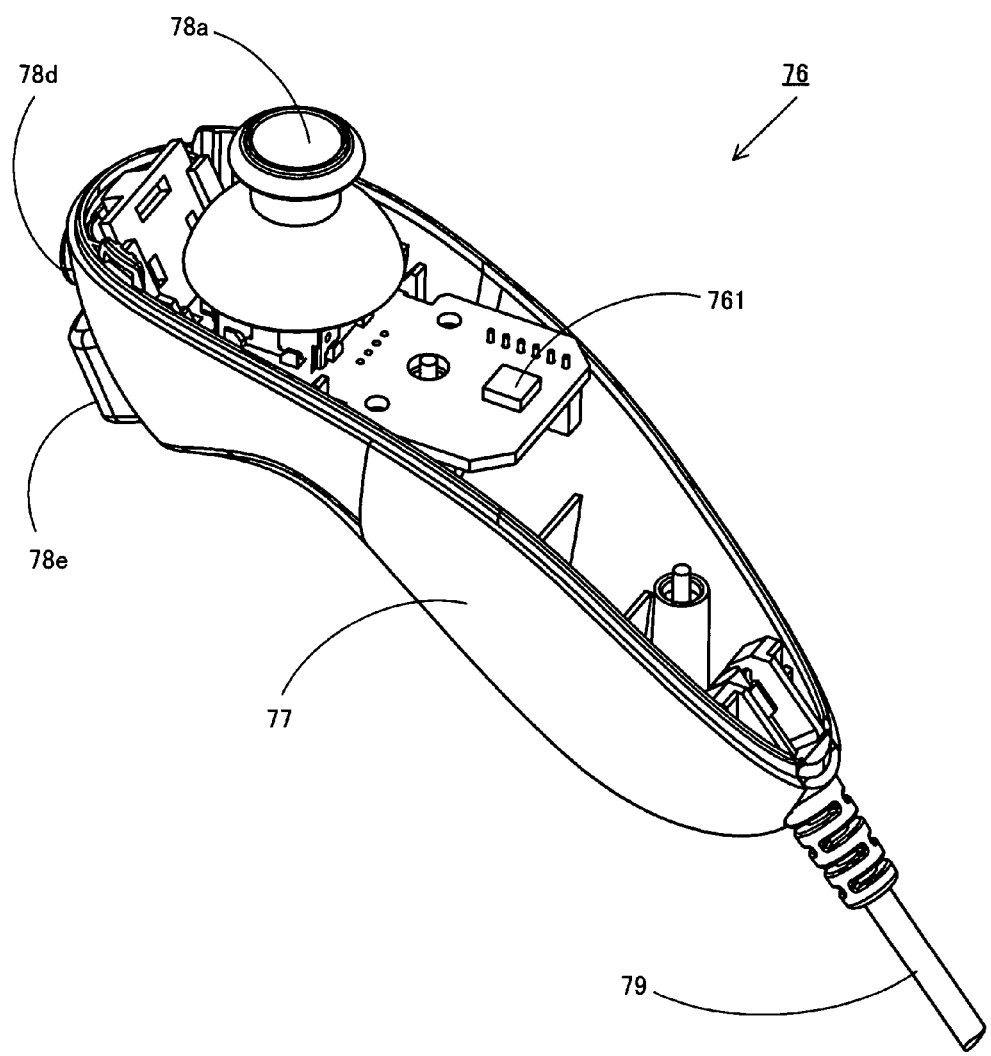

F I G. 1 0
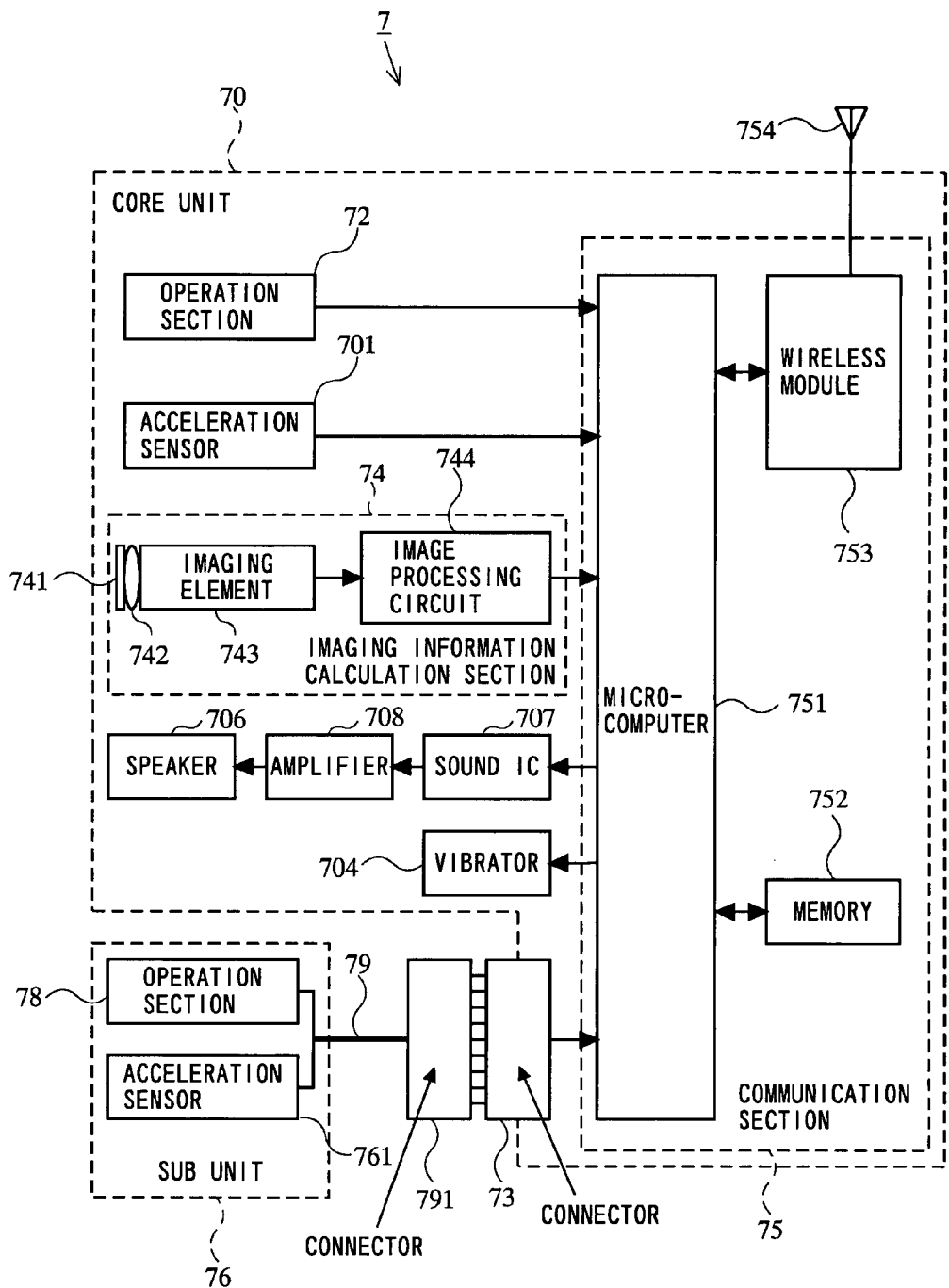

FIG. 13
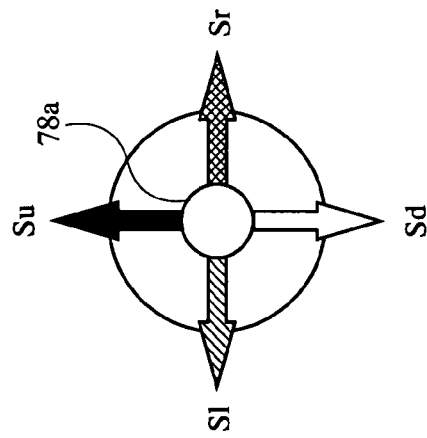
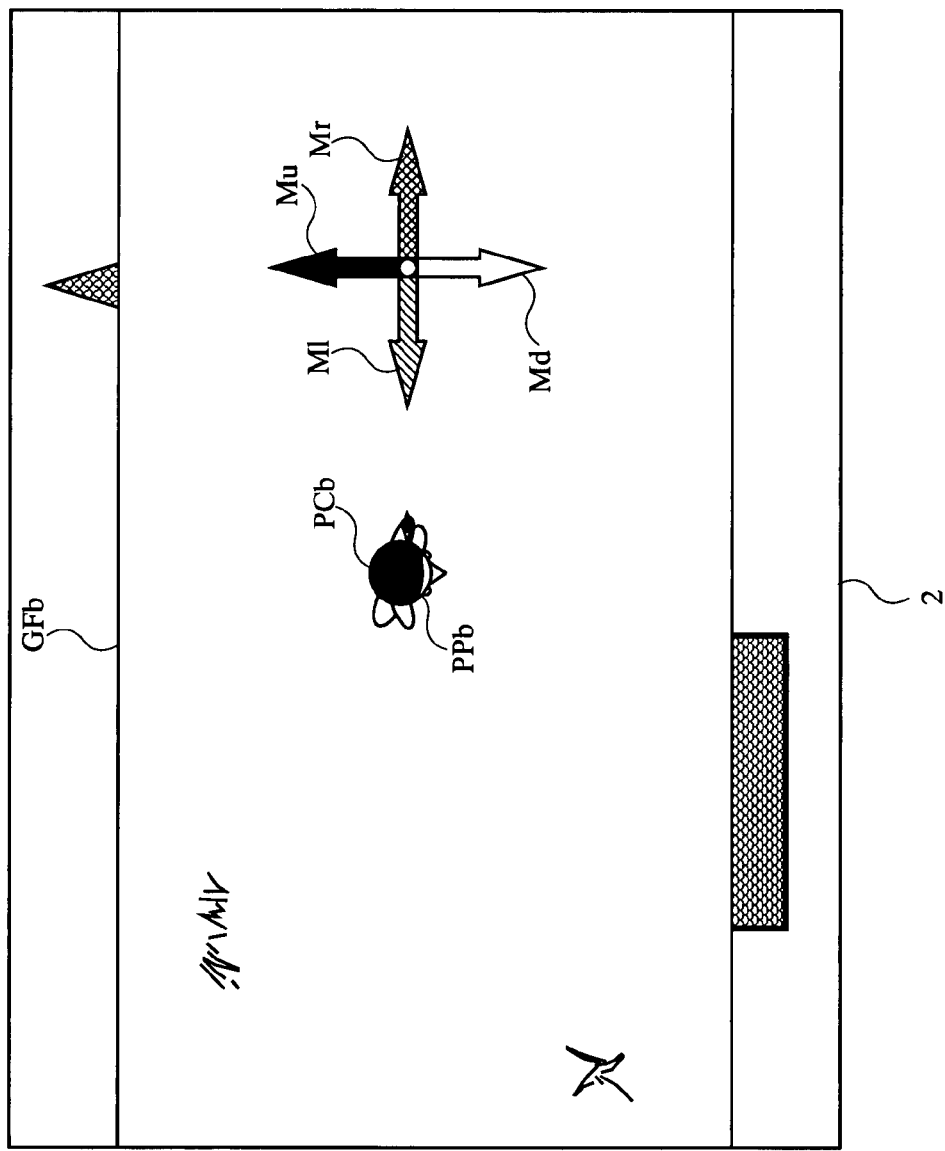

FIG. 14
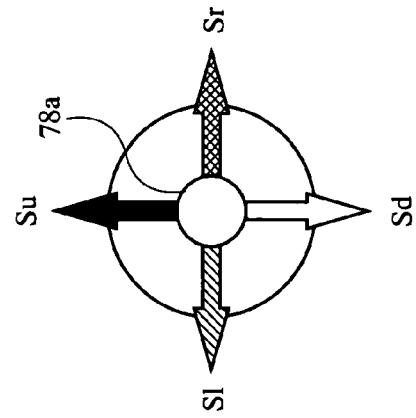
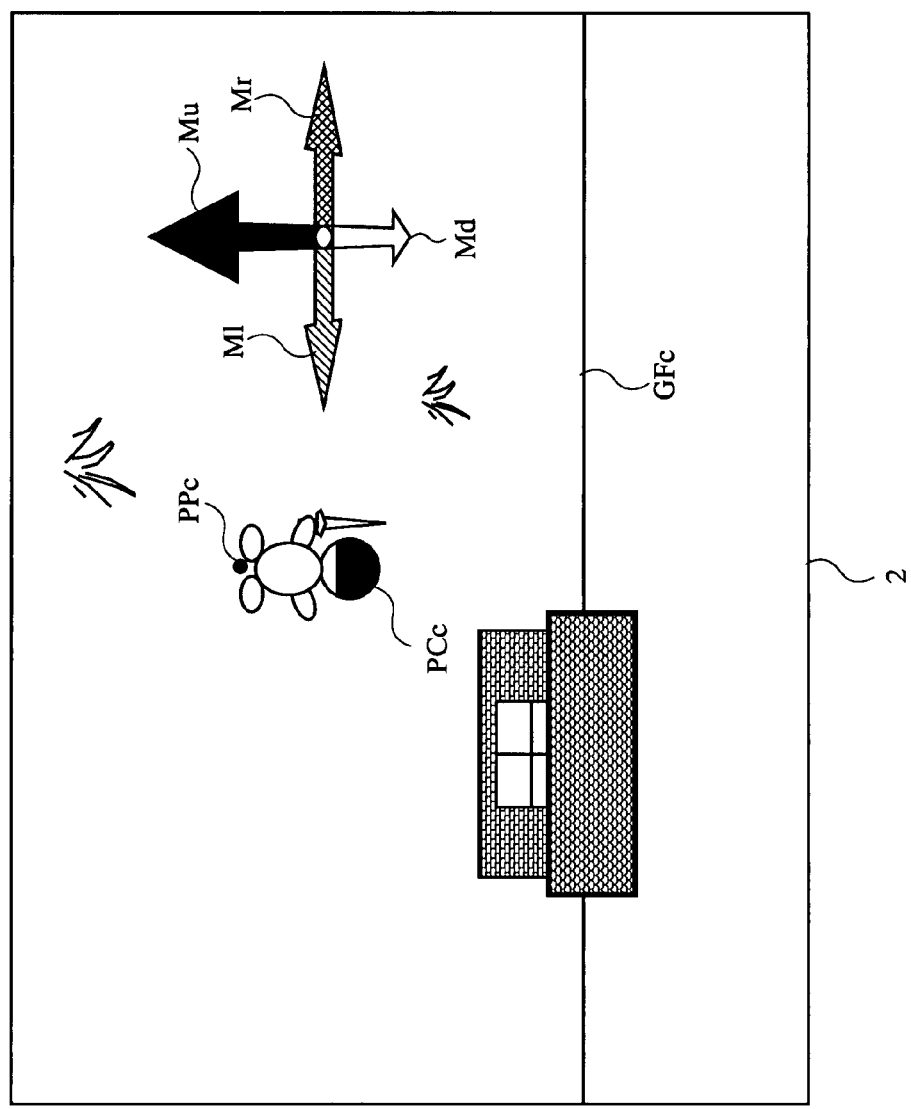

F I G. 2 1
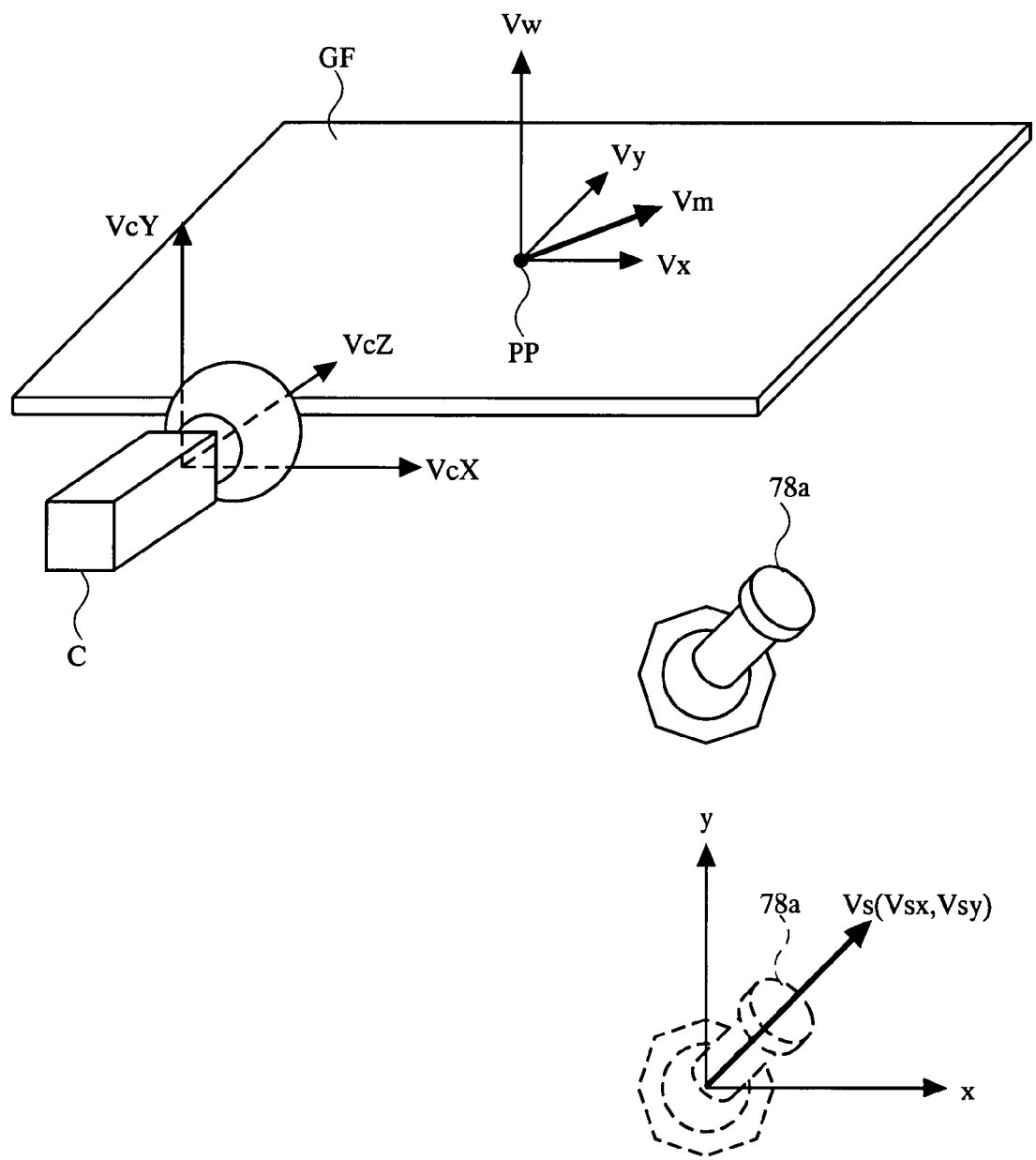

F I G. 2 2
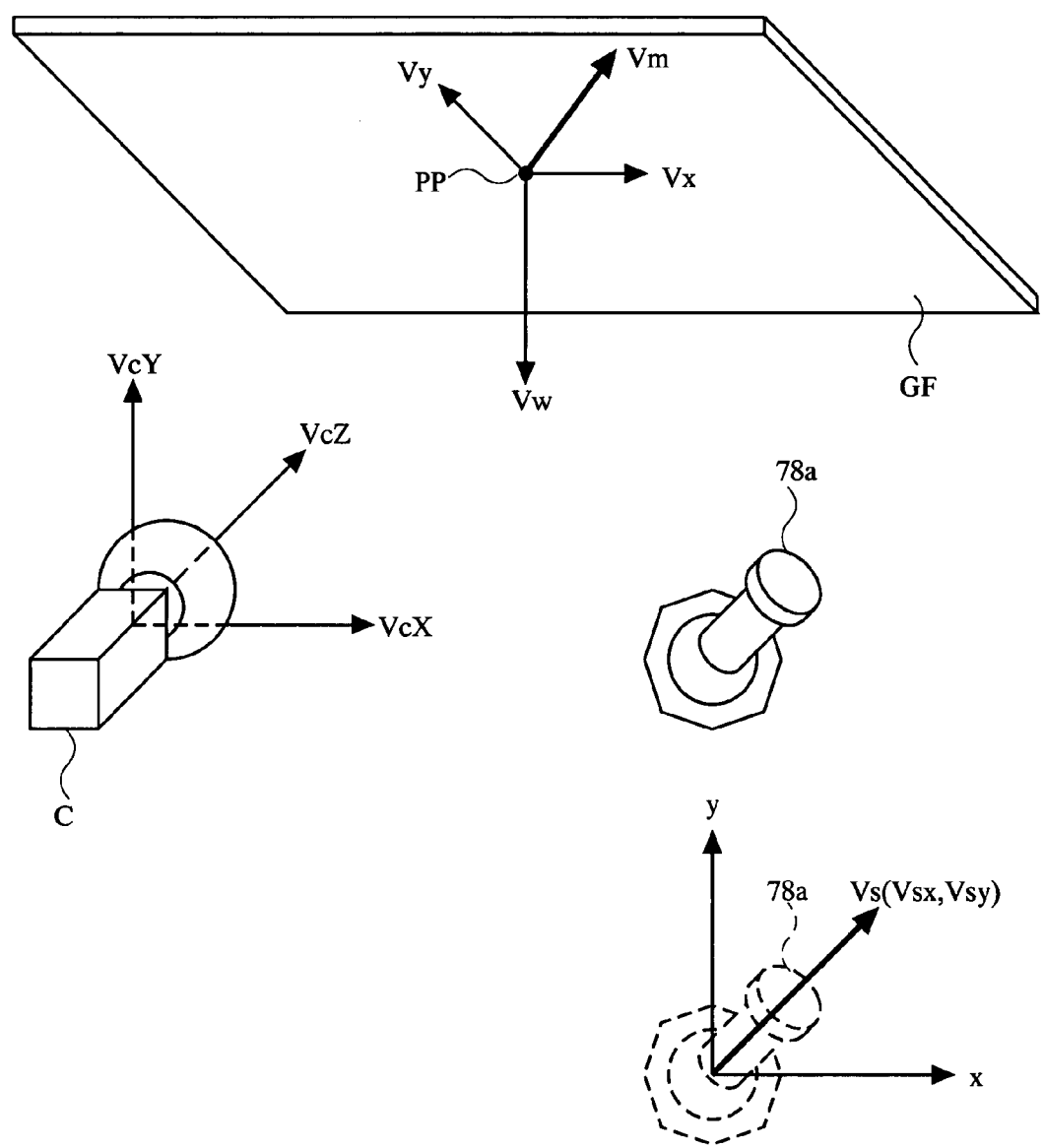

STORAGE MEDIUM HAVING IMAGE PROCESSING PROGRAM STORED THEREON AND IMAGE PROCESSING APPARATUS

CROSS REFERENCE TO RELATED APPLICATION

The disclosure of Japanese Patent Application No. 2007-180294, filed on Jul. 9, 2007, is incorporated herein by reference.

BACKGROUND OF THE INVENTION

Field of the Invention

The present invention relates to a storage medium having an image processing program stored thereon and an image processing apparatus, and more specifically to a storage medium having stored thereon an image processing program for moving an object displayed on a display device based on an input direction, and an image processing apparatus usable for such an image processing program.

Description of the Background Art

Conventionally, games (image processing) in which an object displayed on a display device is moved forward, rearward, leftward and rightward in a virtual world in accordance with an input by a user to a cross switch, a stick or the like are commonly played. For example, Japanese Laid-Open Patent Publication No. 2002-263359 (hereinafter, referred to as "patent document 1") discloses a video game apparatus for moving an object in response to an operation in an "upward", "downward", "leftward" or "rightward" direction made on an analog joystick or a cross switch. The video game apparatus disclosed in patent document 1 is operated as follows. When a non-player object of interest is locked, a player object is moved in a "direction of moving toward the non-player object of interest", a "direction of moving away from the non-player object of interest", a "leftward direction while keeping the distance from the non-player object of interest", or a "rightward direction while keeping the distance from the non-player object of interest" in accordance with the operation in the "upward", "downward", "leftward" or "rightward" direction, respectively. When a non-player object of interest is not locked, player object is moved "forward", "rearward", "leftward" or "rightward" in accordance with the operation in the "upward", "downward", "leftward" or "rightward" direction, respectively.

According to the conventional art, it is common that an object is moved in the forward-rearward direction in the virtual world when the operation is made in the upward-downward direction as described above. The reason is that the object is assumed to be moved on a plane which is set in the virtual world and that in an image represented in a display screen, the direction corresponding to the upward-downward direction intuitively perceivable by the player basically matches the forward-rearward direction in the virtual world. Therefore, it is not considered to move the object on a terrain with many unexpectable elements such that the standing direction of the object is changed in accordance with the position of the object (for example, the normal direction with respect to the direction of gravity or topography which is set in the virtual world is changed). In addition, when the topography of the position where the object is moving is significantly changed or when the direction of the virtual camera is rapidly changed, it is expected that the player loses the sense of the relationship between the moving direction of the object and the operation direction. As a result, it is expected that after the topography or the direction of the virtual camera is changed, the operation direction cannot be controlled to keep the moving direction continuous from before the change, and thus the operation becomes unstable.

SUMMARY OF THE INVENTION

Therefore, an object of the present invention is to provide a storage medium having stored thereon an image processing program for moving an object in a virtual space displayed on a display device in a direction intuitively associated with the direction which is input by the user, and an image processing apparatus usable for such an image processing program.

The present invention has the following features to attain the object mentioned above. The reference numerals and step numbers in parentheses in this section of the specification indicate the correspondence with the embodiments described later and the drawings for easier understanding of the present invention, and do not limit the present invention in any way.

A first aspect of the present invention is directed to a storage medium having stored thereon an image processing program executable by a computer (10) of an image processing apparatus (5) for displaying, on a display device (2), an operation target object (PC) in a virtual space as seen from a virtual camera (C). The image processing program causes the computer to act as data obtaining means (CPU 10 for executing step 42; hereinafter, only the step number will be described); virtual camera setting means (S41); moving direction determination means (S46, S51); and object moving means (S48, S53). The data obtaining means obtains direction data (Da) based on an input direction which is input by a user. The virtual camera setting means sets a position (Dc1) and a posture (Dc2) of the virtual camera in the virtual space. The moving direction determination means determines a moving direction (Vm) of the operation target object in the virtual space in accordance with a direction (Vs) represented by the direction data, based on an exactly upward vector (Vw) representing a direction of a virtual gravity acting on a position (Db1, PP) of the operation target object in the virtual space or a direction of normal in a virtual field (GF) at the position of the operation target object, and also based on a camera vector (VcX, VcY, VcZ) representing the posture of the virtual camera. The object moving means moves the operation target object in the moving direction determined by the moving direction determination means.

In a second aspect based on the first aspect, the direction data represents the input direction (Vsx, Vsy) based on two axial directions (x direction, y direction) perpendicular to each other. The camera vector includes three camera vectors perpendicular to one another, which respectively represent a viewing direction (VcZ) of the virtual camera, a longitudinal direction (VcY) of a displayed image as seen from the virtual camera, and a lateral direction (VcX) of the displayed image. The moving direction determination means selects a first camera vector (Vo; VcY or VcZ) and a second camera vector (VcX) from the three camera vectors (S81 through S88) to calculate a first vector (Vx) perpendicular to the first camera vector and the exactly upward vector and a second vector (Vy) perpendicular to the second camera vector and the exactly upward vector (S89), and determines the moving direction in accordance with the direction represented by the direction data by associating the first vector and the second vector to the two axial directions respectively (S90).

In a third aspect based on the second aspect, the moving direction determination means calculates the first vector by an outer product of the first camera vector and the exactly upward vector, and calculates the second vector by an outer product of the second vector and the exactly upward vector (S89).

In a fourth aspect based on the second aspect, the moving direction determination means selects either the camera vector representing the viewing direction or the camera vector representing the longitudinal direction as the first vector, and selects the camera vector representing the lateral direction as the second camera vector (S81 through S88).

In a fifth aspect based on the fourth aspect, the moving direction determination means selects either the camera vector representing the viewing direction or the camera vector representing the longitudinal direction as the first vector, using an inner product (zdn) of the camera vector representing the viewing direction and the exactly upward vector, and also using an inner product (ydn) of the camera vector representing the longitudinal direction and the exactly upward vector (S81 through S88).

In a sixth aspect based on the fifth aspect, the moving direction determination means compares the inner products, and selects either the camera vector representing the viewing direction or the camera vector representing the longitudinal direction, the inner product of which with the exactly upward vector has a smaller absolute value, as the first camera vector (S82).

In a seventh aspect based on the sixth aspect, the moving direction determination means inverts either the camera vector representing the viewing direction or the camera vector representing the longitudinal direction, the inner product of which with the exactly upward vector has a smaller absolute value in accordance with whether the inner product having the smaller absolute value is positive or negative, and selects the inverted camera vector as the first camera vector (S81 through S88).

In an eighth aspect based on the second aspect, the moving direction determination means selects the first camera vector and the second camera vector using an inner product of each of the three camera vectors and the exactly upward vector (S81 through S88).

In a ninth aspect based on the first aspect, the virtual camera setting means rotates the virtual camera when a predetermined condition is fulfilled (FIG. 15). The image processing program causes the computer further to act as input direction change detection means (S45) and moving direction maintaining means (S80). The input direction change detection means detects that the input direction which is input by the user is changed using the direction data. The moving direction maintaining means determines the moving direction based on the camera vector (Dc3) before the rotation of the virtual camera, until the input direction change detection means detects a change of the input direction after the rotation of the virtual camera (Yes in S45).

In a tenth aspect based on the ninth aspect, the moving direction maintaining means cancels the determination made on the moving direction based on the camera vector before the rotation of the virtual camera when the input direction change detection means detects a change of the input direction after the rotation of the virtual camera (No in S45). The moving direction determination means, when the input direction change detection means detects a change of the input direction after the rotation of the virtual camera, determines the moving direction in accordance with the direction represented by the direction data after the input direction is changed, based on a camera vector representing the posture of the virtual camera after the rotation of the virtual camera.

In an eleventh aspect based on the ninth aspect, the virtual camera setting means rotates the virtual camera around a viewing direction thereof when the predetermined condition is fulfilled.

In a twelfth aspect based on the ninth aspect, the image processing program causes the computer further to act as object posture determination means (S49, S54). The object posture determination means successively determines three posture vectors (Vt, Vf, Vr) perpendicular to one another, which represent the posture of the operation target object, based on the exactly upward vector set at the position of the operation target object and also based on the moving direction determined by the moving direction determination means. The object posture determination means, when a direction of the exactly upward vector which is set at the position of the operation target object is changed before and after the operation target object is moved (Yes in S93), determines the posture of the operation target object by fixing a direction of one of the three posture vectors (Vr) while changing directions of the other two posture vectors (Vt, Vf) until the input direction change detection means detects a change of the input direction.

In a thirteenth aspect based on the first aspect, in the virtual space, a three-dimensional virtual field in which the virtual gravity is set in different directions with respect to an outer circumferential surface thereof is set (FIG. 11). The moving direction determination means determines the moving direction of the operation target object along the outer circumferential surface (GFa through GFc) of the three-dimensional virtual field at the position of the operation target object. The object moving means moves the operation target object in the moving direction determined by the moving direction determination means along the outer circumferential surface of the three-dimensional virtual field.

In a fourteenth aspect based on the thirteenth aspect, the virtual camera setting means sets the virtual camera in accordance with the position of the operation target object, at a position and a posture at which the operation target object is encompassed in a view volume of the virtual camera and the operation target object is displayed on the display device.

A fifteenth aspect of the present invention is directed to an image processing apparatus for displaying, on a display device, an operation target object as seen from a virtual camera. The image processing apparatus comprises data obtaining means; virtual camera setting means; moving direction determination means; and object moving means. The data obtaining means obtains direction data based on an input direction which is input by a user. The virtual camera setting means sets a position and a posture of the virtual camera in a virtual space. The moving direction determination means determines a moving direction of the operation target object in the virtual space in accordance with a direction represented by the direction data, based on an exactly upward vector representing a direction of a virtual gravity acting on a position of the operation target object in the virtual space or a direction of normal in a virtual field at the position, and also based on a camera vector representing the posture of the virtual camera. The object moving means moves the operation target object in the moving direction determined by the moving direction determination means.

According to a sixteenth aspect based on the fifteenth aspect, the direction data represents a direction of the input direction based on two axial directions perpendicular to each other. The camera vector includes three camera vectors perpendicular to one another, which respectively represent a viewing direction of the virtual camera, a longitudinal direction of a displayed image as seen from the virtual camera, and a lateral direction of the displayed image. The moving direction determination means selects a first camera vector and a second camera vector from the three camera vectors to calculate a first vector perpendicular to the first camera vector and the exactly upward vector and a second vector perpendicular to the second camera vector and the exactly upward vector, and determines the moving direction in accordance with the direction represented by the direction data by associating the first vector and the second vector to the two axial directions respectively.

According to a seventeenth aspect based on the fifteenth aspect, the virtual camera setting means rotates the virtual camera when a predetermined condition is fulfilled. The image processing program further comprises input direction change detection means; and moving direction maintaining means. The input direction change detection means detects that the input direction which is input by the user is changed using the direction data. The moving direction maintaining means determines the moving direction based on the camera vector before the rotation of the virtual camera, until the input direction change detection means detects a change of the input direction after the rotation of the virtual camera.

According to the first aspect, the operation target object displayed on the display device can be moved in a direction intuitively associated with the direction input by the user, in accordance with the position or posture of the virtual camera. For example, in a virtual game space using a virtual game field in which the gravitational direction (normal direction) is set in various directions, an intuitive direction input operation is allowed without confusing the user. Even when the virtual camera is rotated when a predetermined condition is fulfilled in such a virtual game space environment, the apparatus allows intuitive direction input operations without confusing the player.

According to the second aspect, even in a situation where the position and posture of the virtual camera and the exactly upward direction with respect to the operation target object are variously changed, a moving direction intuitively perceivable in accordance with the direction input operation can be calculated using two camera vectors selected from three camera vectors perpendicular to one another which represent the posture of the virtual camera, and the exactly upward vector.

According to the third aspect, a vector perpendicular to the first camera vector and the exactly upward vector is used as a first vector, and a vector perpendicular to the second camera vector and the exactly upward vector is used as a second vector. The moving direction can be determined based on the first vector and the second vector.

According to the fourth aspect, in the case where an image in which the direction of the exactly upward direction is parallel to a plane including the longitudinal direction and the viewing direction in the camera coordinate system is generated, an appropriate moving direction in accordance with the direction input operation can be calculated.

According to the fifth aspect, a camera vector suitable to obtain the first vector can be selected using an inner product.

According to the sixth aspect, among the camera vectors representing the viewing direction and the longitudinal direction, the camera vector having a larger angle with the exactly upward vector is selected as the first camera vector, and thus a camera vector suitable to obtain the first vector can be selected.

According to the seventh aspect, the moving direction can be calculated using a camera vector of an appropriate direction in accordance with whether the inner product is positive or negative.

According to the eighth aspect, a camera vector suitable to obtain the first and second vectors can be selected using an inner product.

According to the ninth aspect, when the user does not change the input direction after the virtual camera is rotated, the moving direction determined before the rotation of the virtual camera is maintained. Namely, even if the camera is moved or rotated, the moving direction is maintained with an assumption that the movement or rotation has not occurred. Therefore, as long as the user keeps on inputting the same direction before and after the rotation of the virtual camera, the moving direction of the operation target object is maintained without being changed. Namely, when the user wishes to keep on moving the operation target object in the same direction, the user can continue the same operation regardless of the state of the virtual camera. This way of operation is very easy to understand for the player.

According to the tenth aspect, when the user wishes to change the moving direction of the operation target object or to stop moving the operation target object after the rotation of the virtual camera, the user can change the input direction. Then, the state where the moving direction is maintained is cancelled, and thus the moving direction is changed to the moving direction based on the current position and posture of the virtual camera. When the user makes an operation to change the moving direction of the operation target object in this manner, the operation target object moves in a moving direction intuitively perceivable in accordance with the input direction.

According to the eleventh aspect, even when the virtual camera is rotated around the viewing direction thereof and thus the displayed image is inverted upside down, an intuitive direction input operation is allowed without confusing the user.

According to the twelfth aspect, when the operation target object moves such that the virtual gravity acting thereon is changed, the posture of the operation target object is changed while the direction of one of the posture vectors being fixed. Therefore, the posture change processing is simplified.

According to the thirteenth aspect, even in image processing using a three-dimensional virtual field in which the gravitational direction (normal direction) is set in various directions (e.g., in a three-dimensional game field in which a virtual gravity is set toward the center thereof), an intuitive direction input operation in accordance with the direction of the virtual gravity is allowed without confusing the user.

According to the fourteenth aspect, in a situation where the virtual camera is moved or rotated in a virtual space environment in which the virtual field is set, an intuitive direction input operation is allowed without confusing the user.

An image processing apparatus according to the present invention provides substantially the same effects as those of the above-described storage medium having the image processing program stored thereon.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an isometric view of a core unit 70 shown in FIG. 3 seen from the top rear side thereof;

FIG. 9 is an isometric view of the sub unit 76 shown in FIG. 8, illustrating a state where an upper casing thereof is removed;

FIG. 10 is a block diagram illustrating a structure of the controller 7 shown in FIG. 3;

FIG. 13 shows an example of a game image and a direction of operation performed when a player character PCb is located on a game field GFb;

FIG. 14 shows an example of a game image and a direction of operation performed when a player character PCc is located on a game field GFc;

FIG. 21 shows an example of setting camera vectors VcX, VcY and VcZ, a normal vector Vw, and an operation vector Vs;

FIG. 22 shows another example of setting the camera vectors VcX, VcY and VcZ, the normal vector Vw, and the operation vector Vs.

DESCRIPTION OF THE PREFERRED EMBODIMENTS

Figure 1:
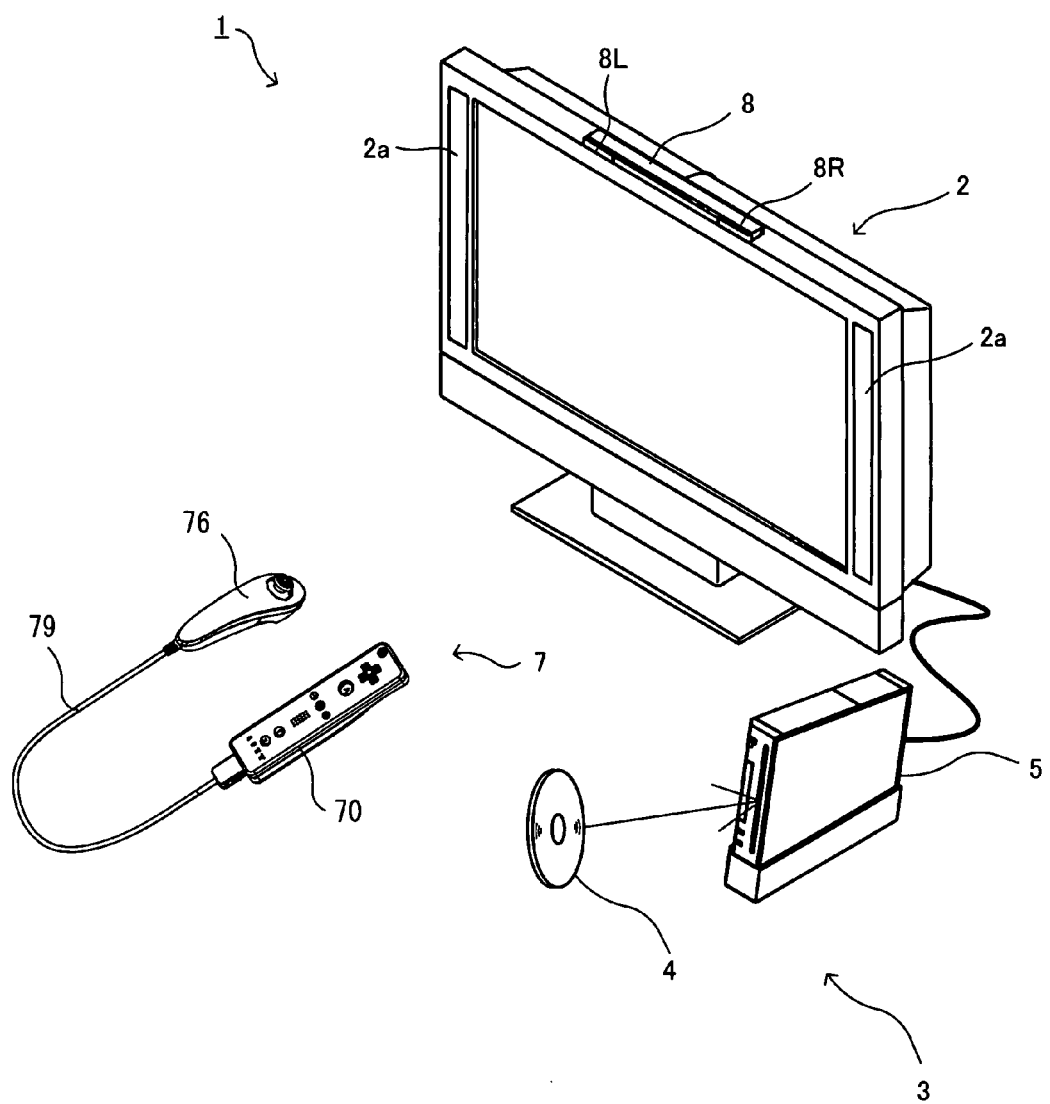
FIG. 1 is an external view of a game system 1 according to one embodiment of the present invention.
Figure 2:
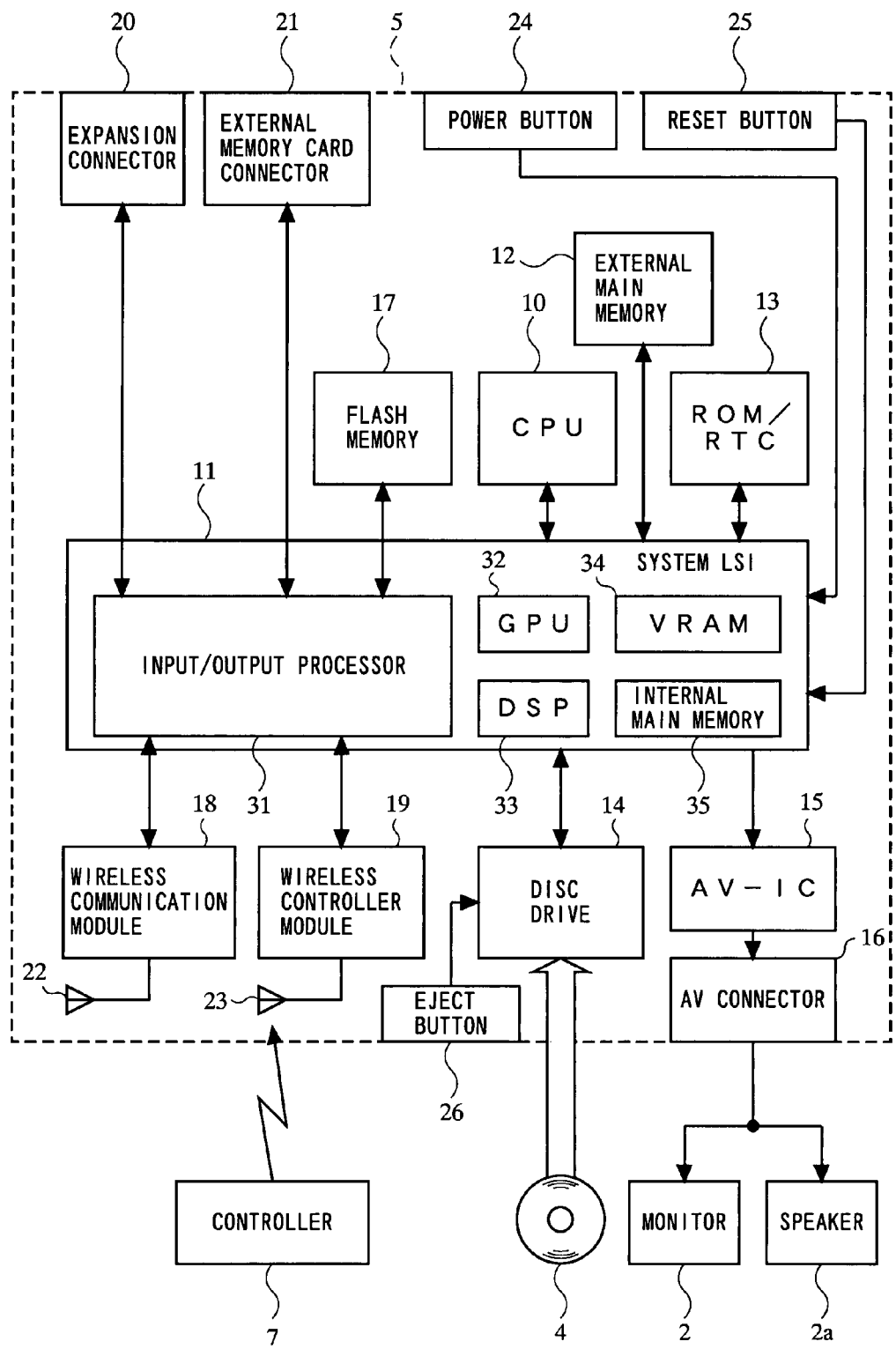
FIG. 2 is a functional block diagram of a game apparatus main body 5 shown in FIG. 1.

With reference to FIG. 1 and FIG. 2, an apparatus for executing an image processing program according to one embodiment of the present invention will be described. Hereinafter, in order to give a specific explanation, a game system including a game apparatus main body 5 of an installation type, which is an example of such an apparatus, will be described. FIG. 1 is an external view of a game system 1 including an installation type game apparatus 3, and FIG. 2 is a block diagram of the game apparatus main body 5. Now, the game system 1 will be described.

As shown in FIG. 1, the game system 1 includes a home-use TV receiver (hereinafter, referred to as a "monitor") 2 as an example of display means and the installation type game apparatus 3 connected to the monitor 2 via a connection cord. The monitor 2 includes speakers 2a for outputting an audio signal which is output from the game apparatus main body 5. The game apparatus 3 includes an optical disc 4 having stored thereon a game program as an exemplary information processing program according to the present invention, the game apparatus main body 5 having a computer mounted thereon for executing the game program stored on the optical disc 4 and causing the monitor 2 to display a game screen, and a controller 7 for providing the game apparatus main body 5 with operation information required to play a game of making operations on characters and the like displayed in the game screen.

The game apparatus main body 5 has a built-in wireless controller module 19 (see FIG. 2). The wireless controller module 19 receives data which is wirelessly transmitted from the controller 7 and transmits data from the game apparatus main body 5 to the controller 7, and thus connects the controller 7 and the game apparatus main body 5 by wireless communication. The optical disc 4, which is an exemplary exchangeably usable information storage medium, is detachably mounted on the game apparatus main body 5.

Also on the game apparatus main body 5, a flash memory 17 (see FIG. 2) acting as a backup memory or the like for fixedly storing saved data or the like is mountable. The game apparatus main body 5 executes a game program or the like stored on the optical disc 4 and displays the result on the monitor 2 as a game image. The game program or the like to be executed is not necessarily stored on the optical disc 4 and may be stored on the flash memory 17 in advance. The game apparatus main body 5 can also reproduce a state of a game played in the past using saved data stored on the flash memory 17 and display a game image on the monitor 2. The player using the game apparatus main body 5 can enjoy the game by operating the controller 7 while watching the game image displayed on the monitor 2.

The controller 7 wirelessly transmits transmission data such as the operation information or the like to the game apparatus main body 5 having the built-in wireless controller module 19 using, for example, the Bluetooth (registered trademark) technology. The controller 7 includes two control units (a core unit 70 and a sub unit 76) connected to each other via a bendable connection cable 79. The controller 7 is operation means mainly for making an operation on an object or the like displayed on the display screen of the monitor 2. The core unit 70 and the sub unit 76 each include a housing having a size which can be held by one hand and a plurality of operation buttons (including a cross key, a stick and the like) provided exposed on a surface of the housing. As described later in more detail, the core unit 70 includes an imaging information calculation section 74 for taking an image seen from the core unit 70. As an example of an imaging target of the imaging information calculation section 74, two LED modules (hereinafter, referred to as "markers") 8L and 8R are provided in the vicinity of the display screen of the monitor 2. The markers 8L and 8R output, for example, infrared light forward from the monitor 2. The controller 7 (for example, the core unit 70) also can receive transmission data wirelessly transmitted from the wireless controller module 19 of the game apparatus main body 5 by a communication section 75, and generate sound or vibrations in accordance with the transmission data.

In this example, the core unit 70 and the sub unit 76 are connected to each other via the bendable connection cable 79. Alternatively, the sub unit 76 may include a wireless unit, in which case, the connection cable 79 is not necessary. When, for example, a Bluetooth (registered trademark) unit is mounted on the sub unit 76 as a wireless unit, operation data can be transmitted from the sub unit 76 to the core unit 70.

Next, with reference to FIG. 2, an internal structure of the game apparatus main body 5 will be described. The game apparatus main body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, and the like.

The CPU 10 performs the game processing by executing a game program stored on the optical disc 4, and acts as a game processor. The CPU 10 is connected to the system LSI 11. The system LSI 11 is connected to the CPU 10 and also to the external main memory 12, the ROM/RTC 13, the disc drive 14 and the AV-IC 15. The system LSI 11, for example, controls data transfer between the elements connected thereto, generates images to be displayed, and obtains data from external devices. An internal structure of the system LSI 11 will be described later. The external main memory 12, which is of a volatile type, has stored thereon programs including a game program read from the optical disc 4, a game program read from the flash memory 17, or various other data. Thus, the external main memory 12 is used as a work area or a buffer area of the CPU 10. The ROM/RTC 13 includes a ROM having a program for starting the game apparatus main body 5 incorporated thereon (so-called boot ROM) and a clock circuit for counting time (RTC). The disc drive 14 reads program data, texture data or the like from the optical disc 4 and writes the read data onto an internal main memory 35 described later or the external main memory 12.

The system LSI 11 includes an input/output processor 31, a GPU (Graphics Processor Unit) 32, a DSP (Digital Signal Processor) 33, a VRAM (Video RAM) 34, and the internal main memory 35. Although not shown, these elements 31 through 35 are connected with each other via an internal bus.

The GPU 32 is a part of drawing means and generates an image in accordance with a graphics command (a command to draw an image) from the CPU 10. The VRAM 34 stores data necessary for the GPU 32 to execute the graphics command (polygon data, texture data or other data). The GPU 32 uses the data stored on the VRAM 34 to generate an image.

The DSP 33 acts as au audio processor and generates audio data using sound data or sound wave (sound tone) data stored on the internal main memory 35 or the external main memory 12.

The image data and the audio data generated as described above are read by the AV-IC 15. The AV-IC 15 outputs the read image data to the monitor 2 via an AV connector 16, and outputs the read audio data to the speaker 2a built in the monitor 2. Thus, the image is displayed on the monitor 2 and also the sound is output from the speaker 2a.

The input/output processor (I/O processor) 31 transmits or receives data to or from the elements connected thereto, or downloads data from external devices. The input/output processor 31 is connected to the flash memory 17, a wireless communication module 18, the wireless controller module 19, an expansion connector 20, and an external memory card connector 21. The wireless communication module 18 is connected to an antenna 22, and the wireless controller module 19 is connected to an antenna 23.

The input/output processor 31 is connected to a network via the wireless communication module 18 and the antenna 22, and thus can communicate with other game apparatuses or various servers also connected to the network. The input/output processor 31 periodically accesses the flash memory 17, and detects whether or not there is data which needs to be transmitted to the network. When there is such data, the input/output processor 11a transmits such data to the network via the wireless communication module 18 and the antenna 22. The input/output processor 31 also receives data transmitted from other game apparatuses or data downloaded from a download server via the network, the antenna 22 and the wireless communication module 18, and stores the received data on the flash memory 17. The CPU 10 executes the game program and thus reads the data stored on the flash memory 17 to be used for the game program. The flash memory 17 may have stored thereon data saved as a result of playing the game using the game apparatus main body 5 (data after or in the middle of the game) as well as the data to be transmitted to, or data received from, the other game apparatuses or various servers.

The input/output processor 31 receives operation data or the like which is transmitted from the controller 7 via the antenna 23 and the wireless controller module 19, and stores the operation data in a buffer area of the internal main memory 35 or the external main memory 12 (temporary storage). The internal main memory 35 may also store a program such as the game program read from the optical disc 4, the game program read from the flash memory 17 or the like, or various other data, or may be used as a work area or a buffer area of the CPU 10.

The input/output processor 31 is connected to the expansion connector 20 and the external memory card connector 21. The expansion connector 20 is a connector for an interface such as USB, SCSI or the like. The expansion connector 20 may be connected to a medium such as an external storage medium or the like, may be connected to a peripheral device such as another controller or the like, or may be connected to a wired communication connector to communicate with the network instead of the wireless communication module 18. The external memory card connector 21 is a connector for an external storage medium such as a memory card or the like. For example, the input/output processor 31 can access an external storage medium via the expansion connector 20 or the external memory card connector 21 to store or read data.

The game apparatus main body 5 (for example, on a front surface) has a power button 24, a reset button 25 for game processing, an insertion opening through which the optical disc 4 can be inserted or removed, an eject button 26 for removing the optical disc 4 from the insertion opening and the like. The power button 24 and the reset button 25 are connected to the system LSI 11. When the power button 24 is turned on, the elements of the game apparatus main body 5 are provided with power via an AC adaptor (not shown). When the reset button 25 is pressed, the system LSI 11 restarts a starting program of the game apparatus main body 5. The eject button 26 is connected to the disc drive 14. When the eject button 26 is pressed, the optical disc 4 is dismounted from the disc drive 14.

Figure 3:
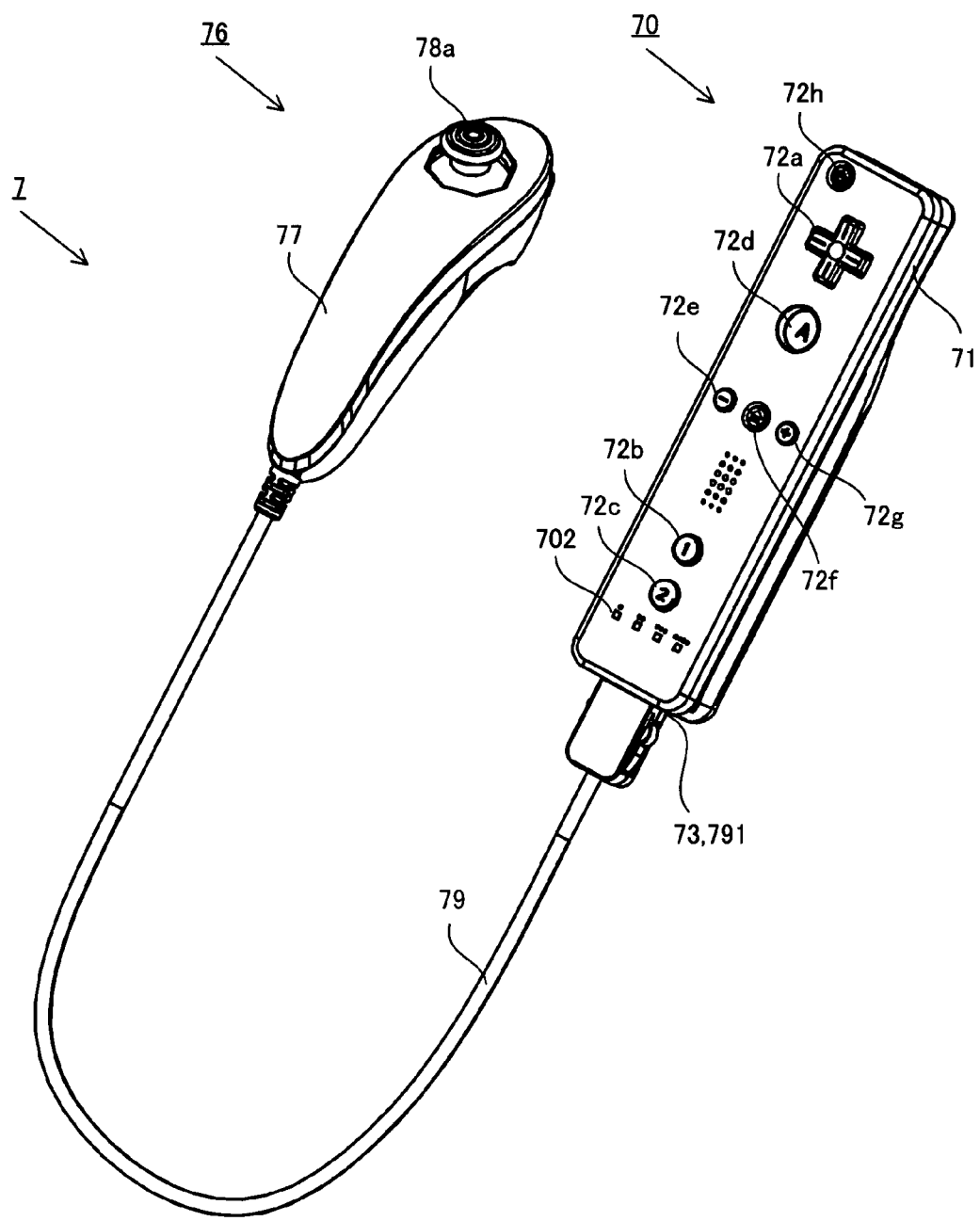
FIG. 3 is an isometric view illustrating an external structure of a controller 7 shown in FIG. 1.

With reference to FIG. 3, the controller 7 will be described. FIG. 3 is an isometric view showing an external appearance of the controller 7.

As shown in FIG. 3, the controller 7 includes the core unit 70 and the sub unit 76 which are connected to each other via the connection cable 79. The core unit 70 has a housing 71, which has a plurality of operation sections 72. The sub unit 76 has a housing 77, which has a plurality of operation sections 78.

One of two ends of the connection cable 79 is provided with a connector 791 which is detachable with a connector 73 of the core unit 70. The other end of the connection cable 79 is fixedly connected with the sub unit 76. The connector 791 of the connection cable 79 is engaged with the connector 73 provided on a rear surface of the core unit 70, and thus the core unit 70 and the sub unit 76 are connected to each other via the connection cable 79.

Figure 5:
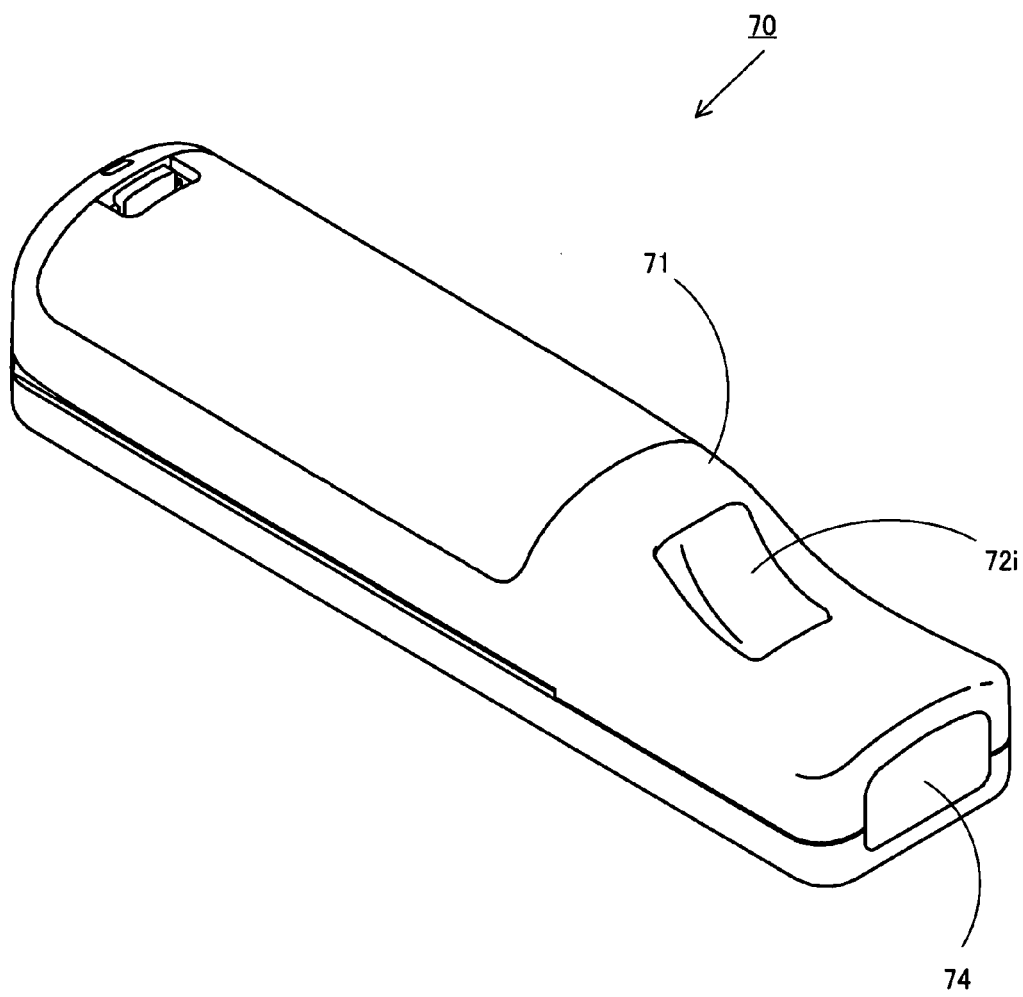
FIG. 5 is an isometric view of the core unit 70 shown in FIG. 4 seen from the bottom front side thereof.

With reference to FIG. 4 and FIG. 5, the core unit 70 will be described. FIG. 4 is an isometric view of the core unit 70 seen from the top rear side thereof. FIG. 5 is an isometric view of the core unit 70 seen from the bottom front side thereof.

As shown in FIG. 4 and FIG. 5, the core unit 70 includes the housing 71 formed by, for example, plastic molding. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes projecting operation portions corresponding to the four directions (front, rear, right and left) and arranged at an interval of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or instruct a direction in which a cursor is to move.

The cross key 72a is an operation section for outputting an operation signal in accordance with the above-described direction which is input by the player, but such an operation section may be provided in another form. For example, the cross key 72 may be replaced with a composite switch including a ring-shaped push switch having four-direction operation parts and a center switch provided at the center thereof. Alternatively, the cross key 72a may be replaced with an operation section which includes an inclinable stick projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad. Still alternatively, the cross key 72a may be replaced with an operation section which includes at least four switches representing four directions (forward, rearward, leftward and rightward) and outputs an operation signal in accordance with one of the switches pressed by the player.

Rearward to the cross key 72a on the top surface of the housing 71, a plurality of operation buttons 72b through 72g are provided. The operation buttons 72b through 72g are each an operation section for outputting a respective operation signal when the player presses a head thereof. For example, the operation buttons 72b through 72d are assigned functions of a first button, a second button, and an A button. The operation buttons 72e through 72g are assigned functions of a minus button, a home button and a plus button, for example. The operation buttons 72b through 72g are assigned various functions in accordance with the game program executed by the game apparatus 3. In the exemplary arrangement shown in FIG. 4, the operation buttons 72b through 72d are arranged in a line extending in a forward-rearward direction at the center of the top surface of the housing 71. The operation buttons 72e through 72g are arranged in a line extending in a leftward-rightward direction between the operation buttons 72b and 72d. The operation button 72f has a top surface thereof buried in the top surface of the housing 71, so as not to be inadvertently pressed by the player.

Forward to the cross key 72a on the top surface of the housing 71, an operation button 72h is provided. The operation button 72h is a power switch for remote-controlling the power of the game apparatus main body 5 to be on or off. The operation button 72h also has a top surface thereof buried in the top surface of the housing 71, so as not to be inadvertently pressed by the player.

Rearward to the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to the controller 7 that he/she is using. Specifically, the wireless controller module 19 transmits, to the controller 7, a signal for lighting up an LED corresponding to the type of the controller 7 among the plurality of LEDs 702.

On the top surface of the housing 71, sound holes for outputting a sound from a speaker (speaker 706 in FIG. 6) described later are provided between the operation button 72b and the operation buttons 72e through 72g.

On a bottom surface of the housing 71, a recessed portion is formed. The recessed portion is formed at a position at which an index finger or middle finger of the player is located when the player holds the core unit 70. On a slope surface of the recessed portion, an operation button 72i is provided. The operation button 72i is an operation section acting as, for example, a B button.

On the front surface of the housing 71, an imaging element 743 included in the imaging information calculation section 74 is provided. The imaging information calculation section 74 is a system for analyzing image data taken by the core unit 70, and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the core unit 70. The structure of the imaging information calculation section 74 will be described later in detail. On a rear surface of the housing 71, a connector 73 is provided. The connector 73 is, for example, an edge connector, and is used for engaging and connecting the core unit 70 with a connection cable.

Figure 6:
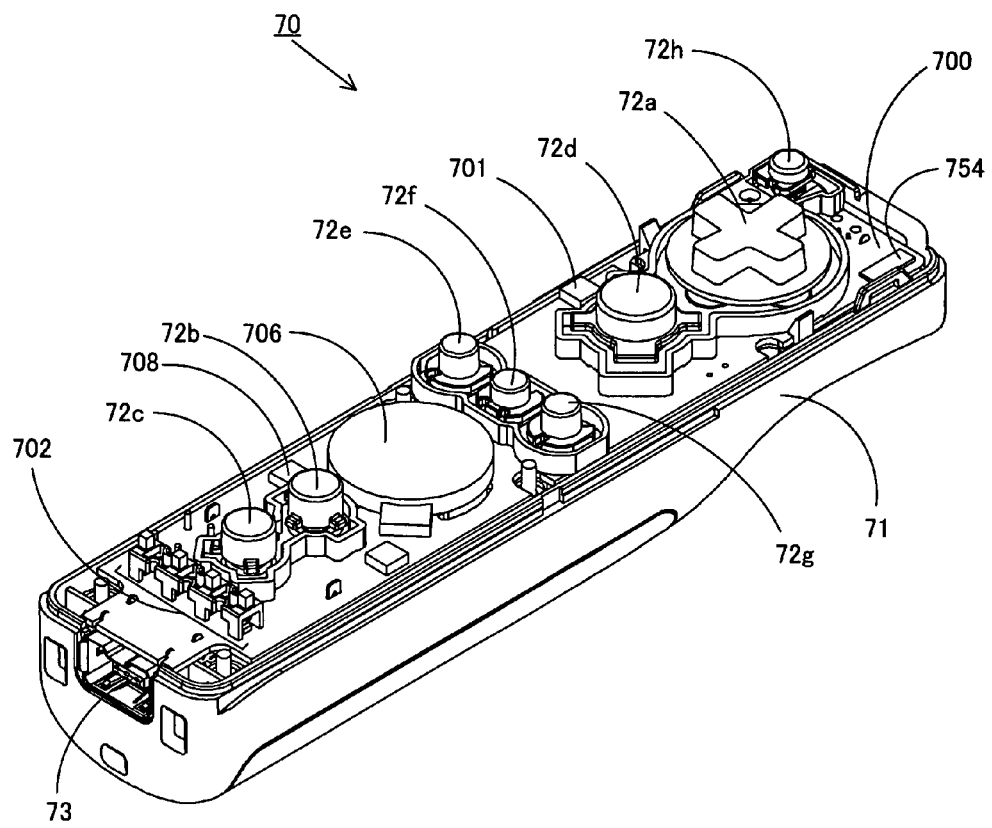
FIG. 6 is an isometric view of the core unit 70 shown in FIG. 3, illustrating a state where an upper casing thereof is removed.
Figure 7:
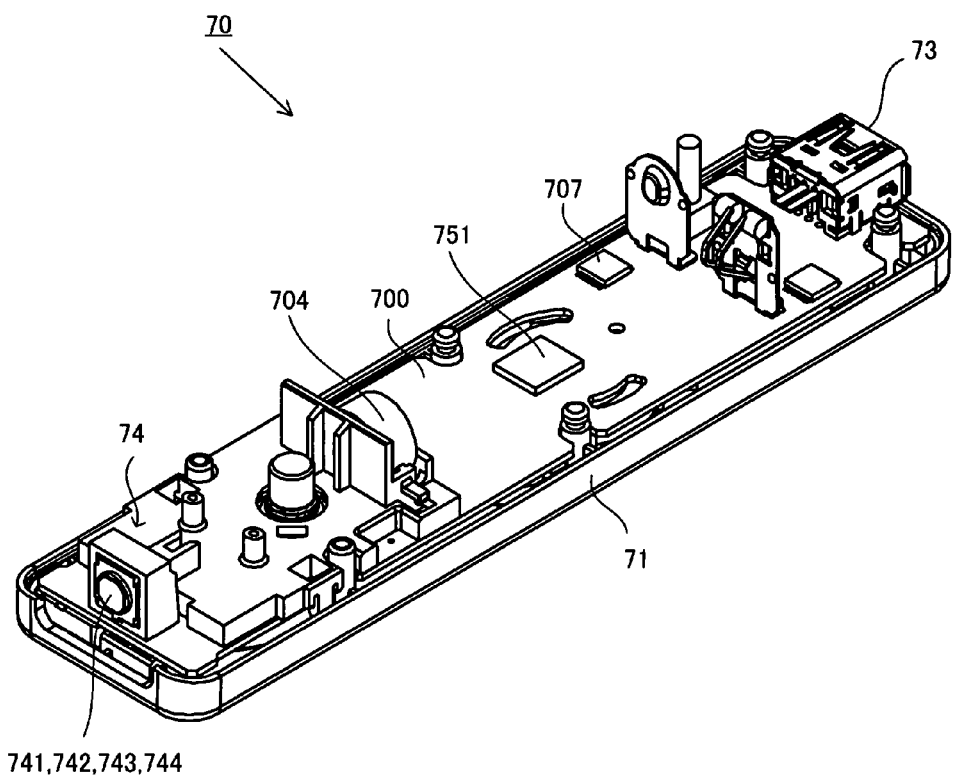
FIG. 7 is an isometric view of the core unit 70 shown in FIG. 5, illustrating a state where a lower casing thereof is removed.

With reference to FIG. 6 and FIG. 7, an internal structure of the core unit 70 will be described. FIG. 6 is an isometric view of the core unit 70 seen from the rear side, illustrating a state where an upper casing (a part of the housing 71) of the core unit 70 is removed. FIG. 7 is an isometric view of the core unit 70 seen from the front side, illustrating a state where a lower casing (a part of the housing 71) of the core unit 70 is removed. FIG. 7 shows a reverse side of a substrate 700 shown in FIG. 6.

As shown in FIG. 6, the substrate 700 is fixed inside the housing 71. On a top main surface of the substrate 700, the operation buttons 72a through 72h, an acceleration sensor 701, the LEDs 702, an antenna 754 and the like are provided. These elements are connected to a microcomputer 751 (see FIG. 7 and FIG. 10) or the like via lines (not shown) formed on the substrate 700 or the like. The core unit 70 acts as a wireless controller owing to a wireless module 753 (see FIG. 10) and the antenna 754. The housing 71 accommodates a quartz vibrator (not shown) for generating a reference clock of the microcomputer 751 described later in detail. On the top main surface of the substrate 700, the speaker 706 and an amplifier 708 are provided.

The acceleration sensor 701 is provided on the substrate 700 to the left of the operation button 72d (i.e., in a peripheral area of the substrate 700, not in a central area). Owing to such an arrangement, when the core unit 70 rotates around the longitudinal direction thereof, the acceleration sensor 701 detects an acceleration including a centrifugal force component in addition to a component of direction change of gravitational acceleration. As a result, the game apparatus main body 5 or the like can determine the rotation of the core unit 70 at a high sensitivity based on the detected acceleration through a predetermined calculation. For example, the acceleration sensor 701 included in the core unit 70 may be a three-axial acceleration sensor. The three-axial acceleration sensor 701 detects a linear acceleration in three directions, i.e., upward-downward, leftward-rightward, and forward-rearward directions. Data representing the acceleration detected by the acceleration sensor 701 is output to the communication section 75.

As shown in FIG. 7, at a front edge of a bottom main surface of the substrate 700, the image information calculation section 74 is provided. The image information calculation section 74 includes an infrared filter 741, a lens 742, the imaging element 743 and an image processing circuit 744 located in this order from the front surface of the core unit 70. These elements are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 via lines provided on the substrate 700 or the like, and outputs a sound signal to the speaker 706 via the amplifier 708 in accordance with the sound data transmitted from the game apparatus main body 5. On the bottom main surface of the substrate 700, a vibrator 704 is attached. The vibrator 704 is, for example, a vibration motor or a solenoid. The core unit 70 is vibrated by an actuation of the vibrator 704, and the vibration is conveyed to the player holding the core unit 70. Thus, a so-called vibration-responsive game can be played. Since the vibrator 704 is provided slightly forward with respect to the center of the housing 71, the housing 71 held by the player is largely vibrated. Thus, the player easily senses the vibration.

Figure 8:
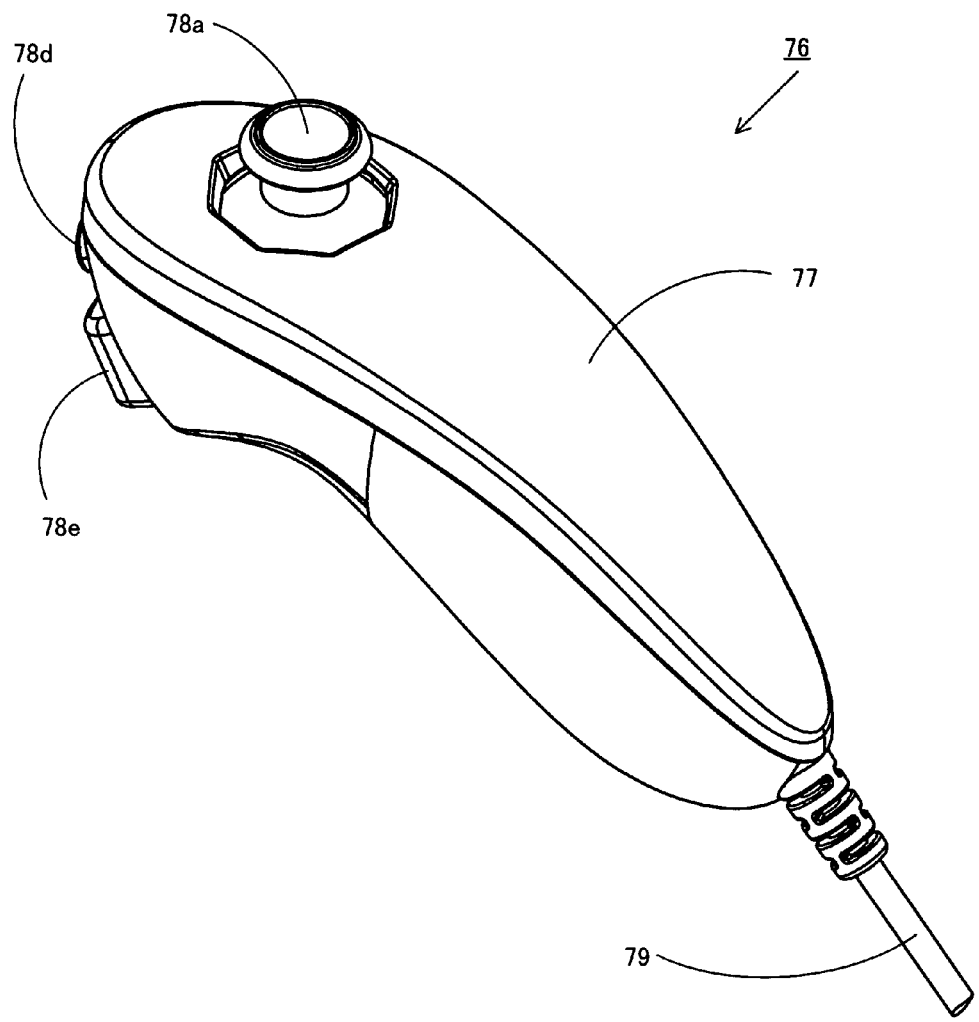
FIG. 8 is an isometric view showing an example of a sub unit 76 shown in FIG. 3.

With reference to FIG. 8 and FIG. 9, the sub unit 76 will be described. FIG. 8 is an isometric view showing an example of the sub unit 76. FIG. 9 is an isometric view of the sub unit 76, illustrating a state where an upper housing (a part of the housing 77) of the sub unit 76 is removed.

As shown in FIG. 8, the sub unit 76 includes the housing 77 formed by, for example, plastic molding. The housing 77 has a streamline shape which extends in a longitudinal direction from front to rear and has a head part, which is the thickest part of the sub unit 76, at a front end thereof. The overall size of the housing 77 is small enough to be held by one hand of an adult or even a child.

On a front surface of the housing 77, in the vicinity of the thickest part, a stick 78a is provided. The stick 78a is an operation section protruding from the front surface of the housing 77. When being inclined, the stick 78a detects an inclination direction and an inclination amount thereof and outputs an signal in accordance therewith. The player can instruct, for example, any direction or position by directing the tip of the stick 78a in any direction in 360 degrees. Thus, the player can instruct a direction in which a player character or the like appearing in the virtual game world or the like is to move. The player can instruct the moving amount of the player character or the like in accordance with the inclination amount of the stick 78a.

The stick 78a is an operation section for outputting an operation signal in accordance with the direction which is input by the player, but such an operation section may be provided in another form. For example, the stick 78a may be replaced with a cross key as described above, or a composite switch including a ring-shaped push switch having four-direction operation parts and a center switch provided at the center thereof. Alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad. Still alternatively, the stick 78a may be replaced with an operation section which includes at least four switches representing four directions (forward, rearward, leftward and rightward) and outputs an operation signal in accordance with one of the switches pressed by the player.

On a front surface of the sub unit 76, a plurality of operation buttons 78d and 78e are provided. The operation buttons 78d and 78e are each an operation section for outputting a respective operation signal when the player presses a head thereof. For example, the operation buttons 78d and 78e are assigned functions of an X button and a Y button. The operation buttons 78d and 78e are assigned various functions in accordance with the game program executed by the game apparatus 3. In the arrangement shown in FIG. 8, the operation buttons 78d and 78e are serially provided in the upward-downward direction on the front surface of the housing 77.

As shown in FIG. 9, a substrate is fixed inside the housing 77. On a top main surface of the substrate, the stick 78a, an acceleration sensor 761 and the like are provided. These elements are connected to the connection cable 79 via lines (not shown) formed on the substrate or the like. The acceleration sensor 761 is preferably located at a position at the center both in the longitudinal direction and also in the width direction perpendicular to the longitudinal direction of the housing 77. For example, the acceleration sensor 761 is, for example, a three-axial acceleration sensor. The three-axial acceleration sensor 761 detects a linear acceleration in three directions, i.e., upward-downward, leftward-rightward, and forward-rearward directions. Data representing the acceleration detected by the acceleration sensor 761 is output to the communication section 75 via the connection cable 79.

With reference to FIG. 10, an internal structure of the controller 7 will be described. FIG. 10 is a block diagram showing a structure of the controller 7.

As shown in FIG. 10, the core unit 70 includes the communication section 75 in addition to the operation sections 72, the imaging information calculation section 74, the acceleration sensor 701, the vibrator 704, the speaker 706, the sound IC 707 and the amplifier 708 described above. The sub unit 76 includes the operation sections 78 and the acceleration sensor 761 described above, and is connected to the microcomputer 751 via the connection cable 79, the connector 791 and the connector 73.

The imaging information calculation section 74 includes the infrared filter 741, the lens 742, the imaging element 743 and the image processing circuit 744. The infrared filter 741 allows only infrared light to pass therethrough, among light incident on the top surface of the core unit 70. The lens 742 collects the infrared light which has passed through the infrared filter 741 and outputs the infrared light to the imaging element 743. The imaging element 743 is a solid-state imaging device such as, for example, a CMOS sensor or a CCD, and takes an image of the infrared light collected by the lens 742. Accordingly, the imaging element 743 takes an image of only the infrared light which has passed through the infrared filter 741 for generating image data. The image data generated by the imaging element 743 is processed by the image processing circuit 744. Specifically, the image processing circuit 744 processes the image data obtained from the imaging element 743, senses an area thereof having a high brightness, and outputs the processing result data representing the detected position coordinate and size of the area to the communication section 75. The imaging information calculation section 74 is fixed to the housing 71 of the core unit 70. The imaging direction of the imaging information calculation section 74 can be changed by changing the direction of the housing 71.

The communication section 75 includes the microcomputer 751, a memory 752, the wireless module 753, and the antenna 754. The microcomputer 751 controls the wireless module 753 for wirelessly transmitting the transmission data, while using the memory 752 as a storage area during processing. The microcomputer 751 also controls the operation of the sound IC 707 and the vibrator 704 in accordance with the data transmitted from the game apparatus main body 5 to the wireless module 753 via the antenna 754. The sound IC 707 processes sound data or the like transmitted from the game apparatus main body 5 via the communication section 75. The microcomputer 751 actuates the vibrator 704 in accordance with, for example, the vibration data (e.g., a signal for turning the vibrator 704 on or off) transmitted from the game apparatus main body 5 via the communication section 75.

Data from the core unit 70, including an operation signal from the operation section 72 (core key data), acceleration signals from the acceleration sensor 701 (core acceleration data), and the processing result data from the imaging information calculation section 74, are output to the microcomputer 751. Data transmitted from the sub unit 76 via the connection cable 79, including an operation signal from the operation section 78 (sub key data) and acceleration signals from the acceleration sensor 761 (sub acceleration data), are output to the microcomputer 751. The microcomputer 751 temporarily stores the input data (core key data, sub key data, core acceleration data, sub acceleration data, and the processing result data) in the memory 752 as transmission data which is to be transmitted to the wireless controller module 19. The wireless transmission from the communication section 75 to the wireless controller module 19 is performed at a predetermined time interval. Since game processing is generally performed at a cycle of 1/60 sec., the data collection and the wireless transmission need to be performed at a cycle of a shorter time period. Specifically, the game processing unit is 16.7 ms (1/60 sec.), and the transmission interval of the communication section 75 structured using the Bluetooth (registered trademark) technology is 5 ms. At the transmission timing to the wireless controller module 19, the microcomputer 751 outputs the transmission data stored on the memory 752 as a series of operation information to the wireless module 753. Based on the Bluetooth (registered trademark) technology or the like, the wireless module 753 converts a carrier wave of a predetermined frequency with the operation information and radiates the resultant very weak radio signal from the antenna 754. Namely, the core key data from the operation sections 72 in the core unit 70, the sub key data from the operation sections 78 in the sub unit 76, the core acceleration data from the acceleration sensor 701 in the core unit 70, the sub acceleration data from the acceleration sensor 761 in the sub unit 76, and the processing result data from the imaging information calculation section 74 are converted into a very weak radio signal by the wireless module 743 and radiated from the core unit 70. The wireless controller module 19 of the game apparatus 3 receives the very weak radio signal, and the game apparatus 3 demodulates or decodes the very weak radio signal to obtain the series of operation information (the core key data, the sub key data, the core acceleration data, the sub acceleration data, and the processing result data). Based on the obtained operation information and the game program, the CPU 30 of the game apparatus 3 performs the game processing.

Figure 11:
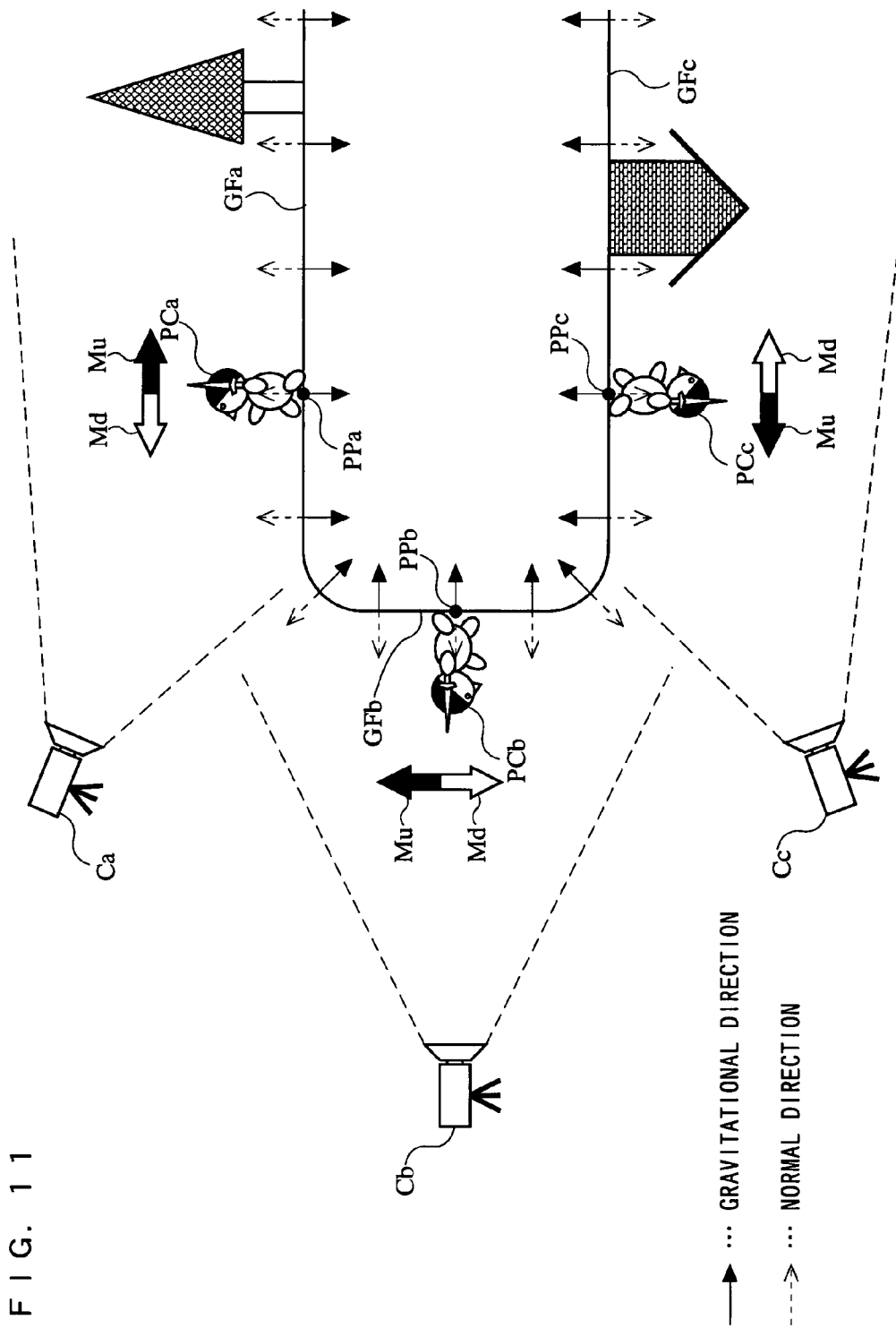
FIG. 11 shows an example of a direction of operation performed on a player character PC located on a game field GF.
Figure 12:
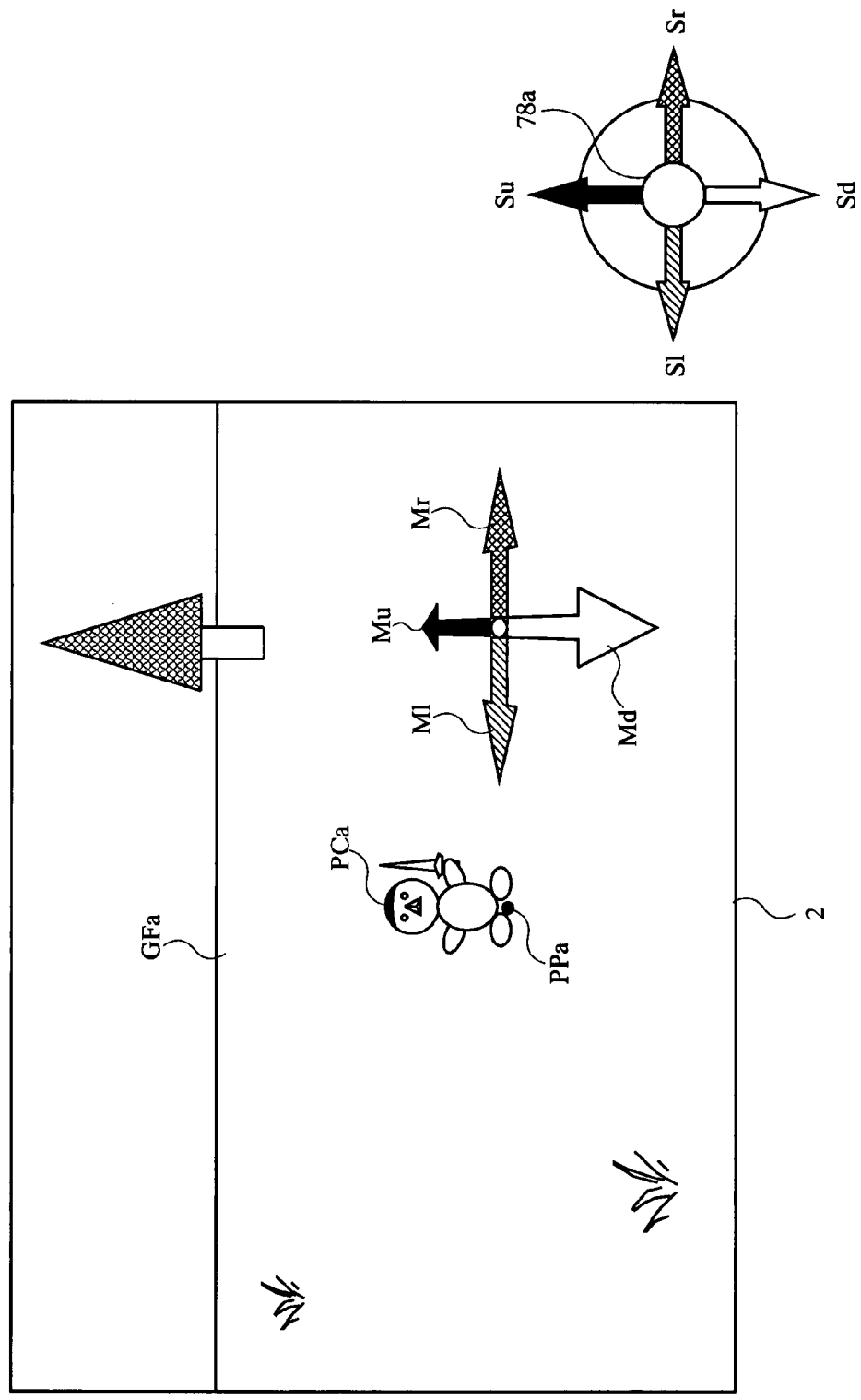
FIG. 12 shows an example of a game image and a direction of operation performed when a player character PCa is located on a game field GFa.
Figure 15:
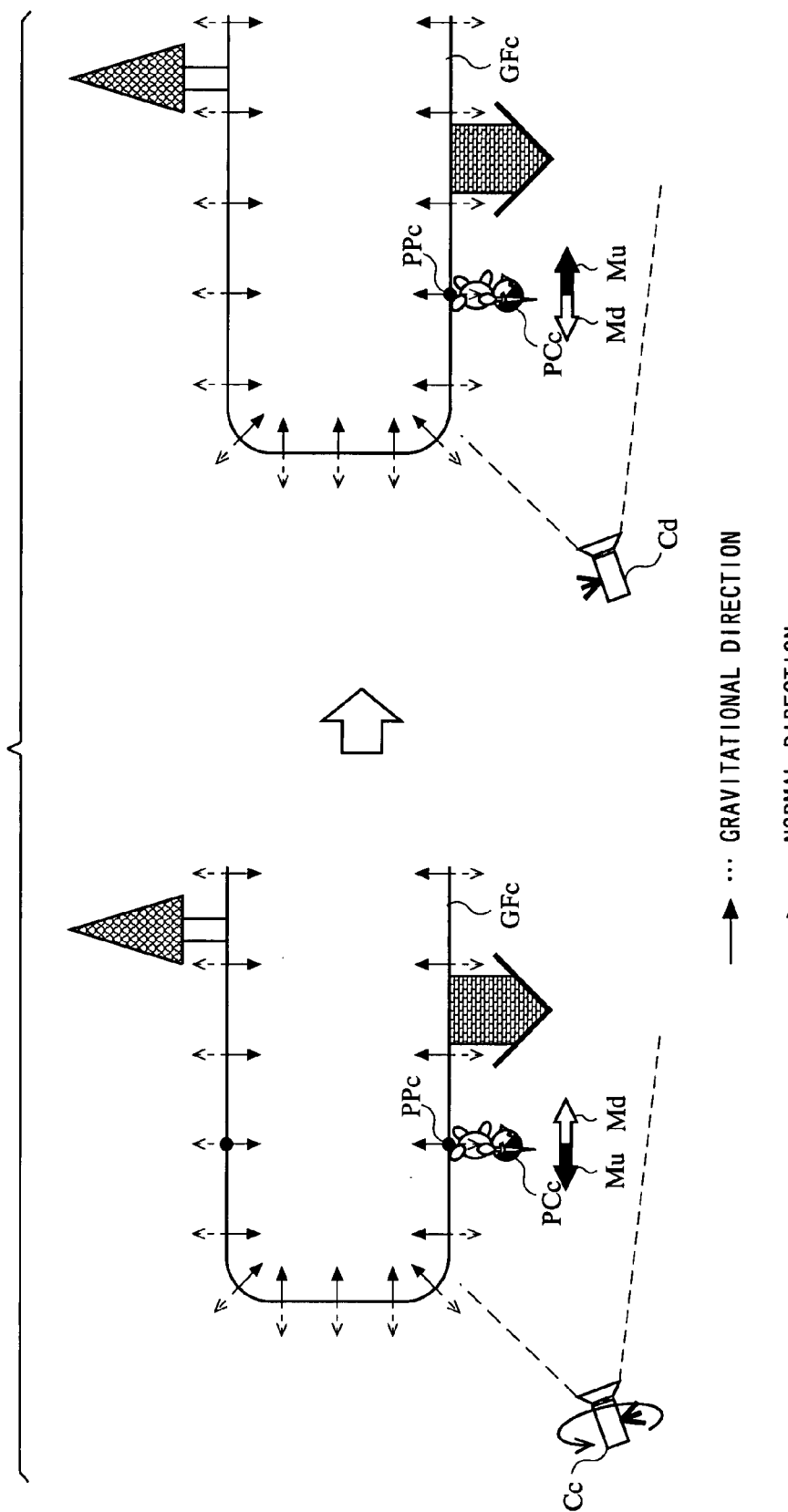
FIG. 15 shows an example of a direction of operation performed when the direction of a virtual camera C is changed with respect to the player character PCc located on the game field GFc.
Figure 16:
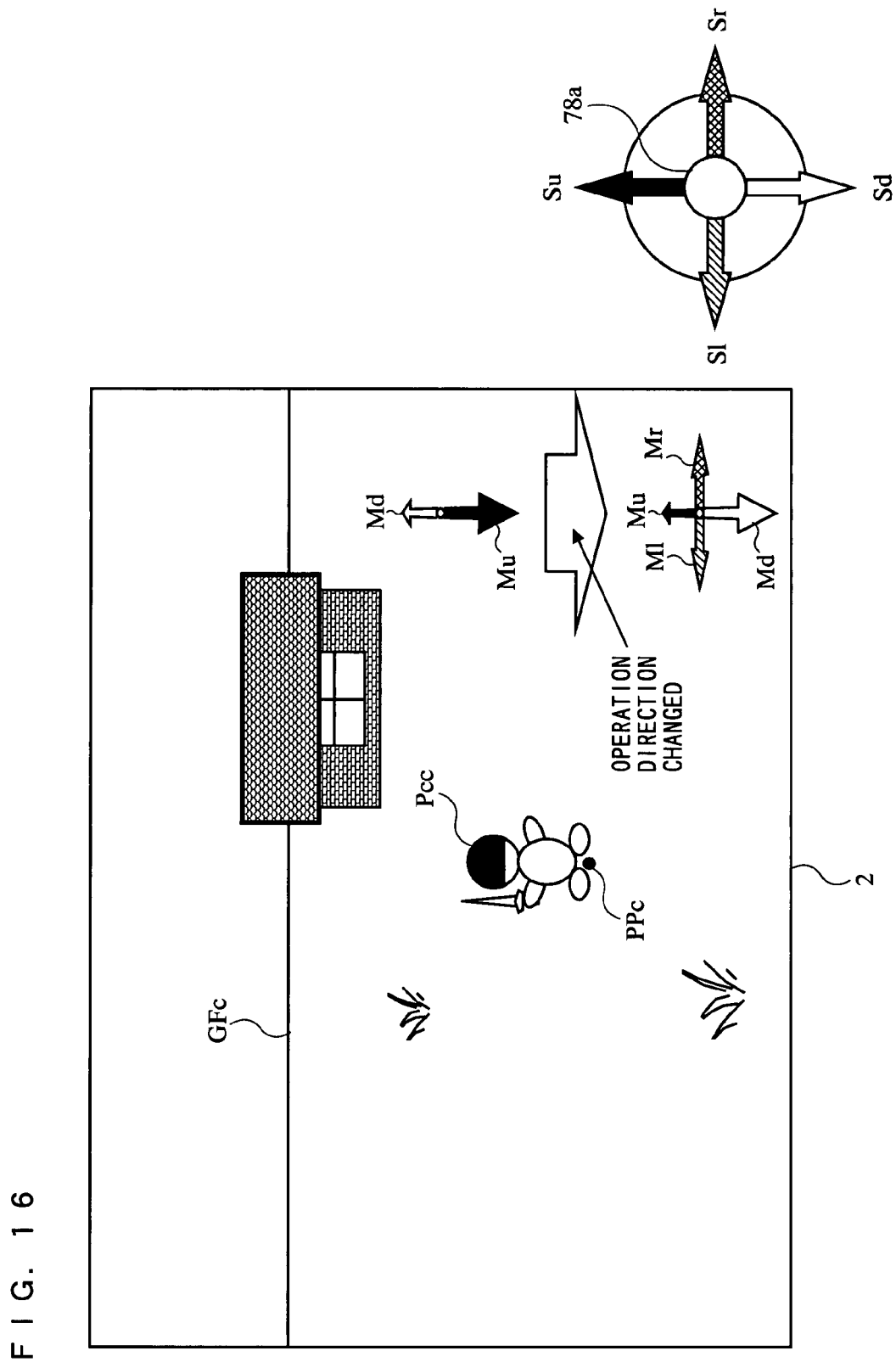
FIG. 16 shows an example of a game image in which the player character PCc is located on the game field GFc and an example of a direction of operation when the direction of the virtual camera C is changed.

Before describing specific processing executed by the game apparatus main body 5, an overview of a game played by the game apparatus main body 5 will be described with reference to FIG. 11 through FIG. 16. FIG. 11 illustrates an example of a direction of operation performed on a player character PC located on a game field GF. FIG. 12 illustrates an example of a game image and a direction of operation performed when a player character PCa on located in a game field GFa. FIG. 13 illustrates an example of a game image and a direction of operation performed when a player character PCb is located on a game field GFb. FIG. 14 illustrates an example of a game image and a direction of operation performed when a player character PCc is located on a game field GFc. FIG. 15 illustrates an example of a direction of operation performed when a direction of a virtual camera C is changed with respect to the player character PCc located on the game field GFc. FIG. 16 illustrates an example of a game image in which the player character PCc is located on the game field GFc and an example of a direction of operation when the virtual camera C is changed while.

As shown in FIG. 11, the game field GF formed of one three-dimensional element is provided in a virtual game space. For example, the game field GF is constructed by locating a game field object, which is obtained as a result of texture mapping performed on a predetermined three-dimensional polygon, in a three-dimensional space coordinate system. The player character PC is located on an outer circumferential surface of the game field GF and is movable along the outer circumferential surface. A player lets the game proceed by moving the player character PC by, for example, inclining the stick 78a.

As shown in FIG. 11, a virtual gravity (hereinafter, referred to simply as a "gravity") of a virtual game space is set toward the center of the game field GF. Namely, the game field GF is set such that the direction of gravity is changed in accordance with the position thereof. In the example of FIG. 11, at a top surface of the game field GF (the game field GFa in FIG. 11), a gravity directed toward the center of the game field GF from the top surface (downward in the virtual game space in FIG. 11) is set. At a side surface of the game field GF (the game field GFb in FIG. 11), a gravity directed toward the center of the game field GF from the side surface (horizontally, (specifically rightward) in the virtual game space in FIG. 11) is set. At a bottom surface of the game field GF (the game field GFc in FIG. 11), a gravity directed toward the center of the game field GF from the bottom surface (upward in the virtual game space in FIG. 11) is set. The player character PC is located on the outer circumferential surface, in contact with one of the fields (the game field GFa, GFb or GFc), so as to be attracted to the gravity set in the game field GF. In other examples, the gravity does not need to be directed toward the center of the game field GF, and may be set game by game. In a location such as a slope or the like, the gravitational direction and the normal direction to the outer circumferential surface do not need to be parallel to each other.

With reference to FIG. 11 and FIG. 12, the player character PCa located at position PPa on the game field GFa is assumed. In this case, a virtual camera C located above the game field GFa (a virtual camera Ca in FIG. 11) takes an image of the player character PCa. As a result, a game image shown in FIG. 12 is generated. When the player inclines the stick 78a upward (direction Su in FIG. 12) in this state, the player gives an instruction to move the player character PCa in a direction away from the virtual camera Ca, i.e., in a direction receding deeper into the virtual game space in the game image (operation direction Mu in FIG. 11 and FIG. 12). When the player inclines the stick 78a downward (direction Sd in FIG. 12), the player gives an instruction to move the player character PCa in a direction toward the virtual camera Ca, i.e., in a direction projecting from the virtual game space in the game image (operation direction Md in FIG. 11 and FIG. 12). When the player inclines the stick 78a leftward or rightward (direction Sl or Sr in FIG. 12), the player gives an instruction to move the player character PCa respectively leftward or rightward as seen from the virtual camera Ca (operation direction Ml or Mr in FIG. 11 and FIG. 12). As clearly understood from FIG. 12, the upward, downward, leftward and rightward directions of the stick 78a respectively match the upward, downward, leftward and rightward directions of the game image. Therefore, the moving directions of the player character PCa are respectively associated with the directions intuitively perceivable by the directions of operation performed by the player.

With reference to FIG. 11 and FIG. 13, the player character PCb located at position PPb on the game field GFb is assumed. In this case, a virtual camera C located left to the game field GFb (for example, a position in an exactly upward direction with respect to the player character PC; a virtual camera Cb in FIG. 11) takes an image of the player character PCb. As a result, a game image shown in FIG. 13 is generated. When the player inclines the stick 78a upward (direction Su in FIG. 13) in this state, the player gives an instruction to move the player character PCb upward as seen from the virtual camera Ca (operation direction Mu in FIG. 11 and FIG. 13). When the player inclines the stick 78a downward (direction Sd in FIG. 13), the player gives an instruction to move the player character PCb downward as seen from the virtual camera Ca (operation direction Md in FIG. 11 and FIG. 13). When the player inclines the stick 78a leftward or rightward (direction Sl or Sr in FIG. 13), the player gives an instruction to move the player character PCb respectively leftward or rightward as seen from the virtual camera Ca (operation direction Ml or Mr in FIG. 11 and FIG. 13). As clearly understood from FIG. 13, the upward, downward, leftward and rightward directions of the stick 78a respectively match the upward, downward, leftward and rightward directions of the game image. Therefore, the moving directions of the player character PCb are respectively associated with the directions intuitively perceivable by the directions of operation performed by the player.

With reference to FIG. 11 and FIG. 14, the player character PCc located at position PPc on the game field GFc is assumed. In this case, a virtual camera C located below the game field GFc (a virtual camera Cc in FIG. 11) takes an image of the player character PCc. As a result, a game image shown in FIG. 14 is generated. Namely, as shown in FIG. 14, a game image in which the player character PCc is attracted to, and in contact with, the bottom surface of the game field GF in an upside down state is displayed. When the player inclines the stick 78a upward (direction Su in FIG. 14) in this state, the player gives an instruction to move the player character PCc toward the virtual camera Cc, i.e., in a direction projecting from the virtual game space in the game image (operation direction Mu in FIG. 11 and FIG. 14). When the player inclines the stick 78a downward (direction Sd in FIG. 14), the player gives an instruction to move the player character PCc away from the virtual camera Cc, i.e., a direction receding deeper into the virtual game space in the game image (operation direction Md in FIG. 11 and FIG. 14). When the player inclines the stick 78a leftward or rightward (direction Sl or Sr in FIG. 14), the player gives an instruction to move the player character PCc respectively leftward or rightward as seen from the virtual camera Cc (operation direction Ml or Mr in FIG. 11 and FIG. 14). As clearly understood from FIG. 14, the upward, downward, leftward and rightward directions of the stick 78a respectively match the upward, downward, leftward and rightward directions of the game image. Therefore, the moving directions of the player character PCc are respectively associated with the directions intuitively perceivable by the directions of operation performed by the player.

With reference to FIG. 15, it is assumed that when the up and down directions of the player character PPc are opposite to the up and down directions of the screen, the virtual camera Cc is rotated around the imaging direction (viewing direction) thereof, such that the up and down directions of the player character PPc match the up and down directions of the screen. In FIG. 15, the left half shows a state before the rotation, and the right half shows a state after the rotation. Before the rotation, the virtual camera Cc is located below the game field GFc and takes an image of the player character PCc. As a result of the virtual camera Cc taking an image, the game image shown in FIG. 14 is generated. The virtual camera Cc is rotated by 180 degrees at the same spot around the viewing direction to generate a game image. The post-rotation camera is represented as a virtual camera Cd in FIG. 15.

The virtual camera Cd located below the game field GFc takes an image of the player character PCc. As a result, a game image shown in FIG. 16 is generated. The game image in FIG. 16 is upside down with respect to the game image in FIG. 14. In this game image, the player character PCc appears to be located on the top surface of the game field GF (actually, the game field GFc).

As a result of the rotation of the virtual camera C, the moving direction of the player character PCc instructed by the player through the upward, downward, leftward or rightward inclination of the stick 78a (directions Su, Sd, Sl or Sr in FIG. 16), is changed. Specifically, the moving direction of the player character PCc instructed by the player through the Su direction (upward) inclination of the stick 78a is changed from the direction toward the virtual camera Cc to the direction away from the virtual camera Cc (direction Mu in FIG. 15 and FIG. 16). As clearly understood from FIG. 16, because the moving direction in accordance with each operation direction is changed as a result of the rotation of the virtual camera C, the upward inclination of the stick 78a represents an instruction to move the player character PPc upward in the game image. Thus, the moving directions of the player character PCc are respectively associated with the directions intuitively perceivable by the directions of operation performed by the player.

The moving direction of the player character PCc instructed by the player through the Sd direction (downward) inclination of the stick 78a is changed from the direction away from the virtual camera Cc to the direction toward the virtual camera Cc (direction Md in FIG. 15 and FIG. 16). As clearly understood from FIG. 16, because the moving direction in accordance with each operation direction is changed as a result of the rotation of the virtual camera C, the downward inclination of the stick 78a represents an instruction to move the player character PPc downward. Thus, the moving directions of the player character PCc are respectively associated with the directions intuitively perceivable by the directions of operation performed by the player. Similarly, as a result of the rotation of the virtual camera C, the leftward and rightward inclinations of the stick 78a respectively represent instructions to move the player character PPc leftward and rightward as seen from the virtual camera C (directions Ml and Mr in FIG. 16).

In this embodiment, the moving directions are changed as a result of the rotation of the virtual camera C when a predetermined condition is fulfilled; specifically, when the operation state on the stick 78a by the player is changed before after the rotation of the virtual camera C. Otherwise, it is assumed that the virtual camera C has not been rotated, and thus the moving directions associated with the operation directions which are set before the rotation of the virtual camera C are maintained. In the example of FIG. 16, while the player keeps on inclining the stick 78a in direction Sd (downward) before and after the rotation of the virtual camera C, the moving direction of the player character PCc is kept to the direction away from the virtual camera Cc (operation direction Md in FIG. 16). When the player loosens the operation on the stick 78a or changes the direction of operation on the stick 78a, the moving direction is changed as described above. Therefore, while the player keeps inputting one direction, the player character PCc keeps on moving in the direction in the virtual game space which was intended by the player when the input of the direction was started. This can a situation where the player is confused or makes an operation error as a result of an abrupt change of the moving direction of the player character PC.

When the player character PC moves from the game field GFa through the game field GFb to the game field GFc, the gravitational direction set in the virtual game space is eventually rotated by 180 degrees. When the moving direction is maintained regardless of the direction on the display screen as described above, the player character PC keeps on moving forward as seen from the player character PC. Therefore, only the direction of an upward vector Vt representing the upward direction with respect to the player character PC (standing direction) and the direction of a forward vector Vf representing the forward direction with respect to the player character PC are changed. The direction of a lateral direction vector Vr representing a lateral direction with respect to the player character PC is not changed. As described later in more detail, when the player character PC passes an area where the gravitational direction is changed, the program executes processing of fixing the lateral direction vector Vr as long as the direction which is input by the player is maintained the same.

Now, the game processing executed by the game system 1 will be described in detail. Regarding the operation of the core unit 70 and the subunit 76 described below, processing executed based on a direction input made on the stick 78a which is obtained from the subunit 76 (sub key data) will be described as an example.

Figure 17:
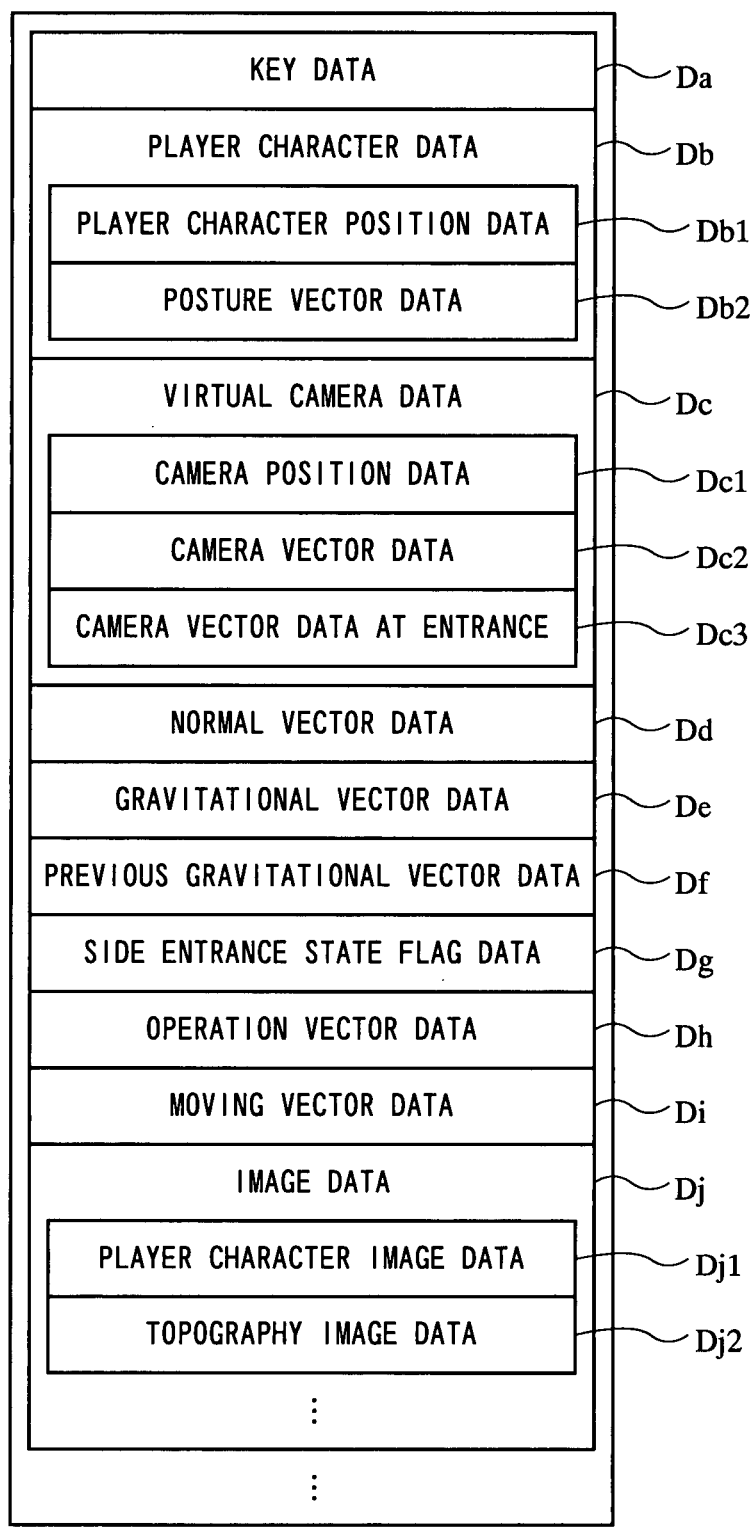
FIG. 17 shows main data stored on a main memory of the game apparatus main body 5.

With reference to FIG. 17, main data used in the game processing will be described. FIG. 17 shows main data stored in the external main memory 12 and/or the internal main memory 35 of the game apparatus main body 5 (hereinafter, collectively referred to simply as the "main memory").

As shown in FIG. 17, the main memory stores key data Da, player character data Db, virtual camera data Dc, normal vector data Dd, gravitational vector data De, previous gravitational vector data Df, side entrance state flag data Dg, operation vector data Dh, moving vector data Di, image data Dj and the like. In addition to the above-mentioned data, the main memory stores data on an object and the like appearing in the game, data on the virtual game space (background data, etc.) and other data necessary for the game processing.

The key data Da represents an operation state on the operation sections 72 and 78 provided in the core unit 70 and the sub unit 76. The key data Da includes the latest core key data and sub key data included in a series of operation information transmitted from the core unit 70 as transmission data. The wireless controller module 19 included in the game apparatus main body 5 includes a buffer (not shown) for receiving the core key data and sub key data included in the operation information transmitted from the core unit 70 at a predetermined cycle (e.g., every $\frac{1}{200}$ sec.) and providing such data to the wireless controller module 19. Then, the latest core key data and sub key data accumulated in the buffer are read every frame (e.g., every $\frac{1}{60}$ sec.), which is a game processing cycle, and thus the key data Da in the main memory is updated. In the following processing, among the core key data and sub key data, the sub key data representing the operation state on the stick 78a is necessary. Therefore, as the key data Da, it is sufficient to store at least the sub key data. In the key data Da, the sub key data obtained in at least two immediately previous game processing cycles is stored.

In the exemplary processing flow described later, the key data Da is updated every frame, which is the game processing cycle. The key data Da may be updated at another processing cycle. For example, the key data Da may be updated each time when the data may be transmitted from the core unit 70, and the updated key data may be used every game processing cycle. In this case, the cycle at which the key data Da is updated is different from the game processing cycle.

The player character data Db represents a position or a posture of the player character PC appearing in the virtual game space. The player character data Db includes player character position data Db1 and posture vector data Db2. In the player character position data Db1, data representing the position PP of the player character PC in the virtual game space is stored. In the posture vector data Db2, data representing the posture of the player character PC in the virtual game space is stored. For example, in the posture vector data Db2, the upward vector Vt representing the upward direction with respect to the player character PC (standing direction), the forward vector Vf representing the forward direction with respect to the player character PC, and the lateral direction vector Vr representing the lateral direction with respect to the player character PC are stored.

The virtual camera data Dc represents the position, the imaging direction or the like of the virtual camera C located in the virtual game space. The virtual camera data Dc includes camera position data Dc1, camera vector data Dc2, and camera vector data at entrance Dc3. In the camera position data Dc1, data representing the position of the virtual camera C in the virtual game space is stored. In the camera vector data Dc2, data representing the imaging direction or posture of the virtual camera C located in the virtual game space is stored. For example, in the camera vector data Dc2, data representing a camera vector VcZ representing the viewing direction in a camera coordinate system (a direction toward a point of attention from the virtual camera C), data representing a camera vector VcX representing a rightward direction in the camera coordinate system (the rightward direction in a display area displayed by the virtual camera C), and data representing a camera vector VcY representing an upward direction in the camera coordinate system (the upward direction in the display area displayed by the virtual camera C) are stored. In the camera vector data at entrance Dc3, data representing camera vectors VcXo, VcYo and VcZo is temporarily stored. The camera vectors VcXo, VcYo and VcZo are respectively substituted (as described later in detail) as representing the camera vectors VcX, VcY and VcZ when the player character PC is in a side entrance state.

The normal vector data Dc represents a normal vector Vw which represents a normal direction to the game field GF from the position PP of the player character PC (upward direction vertical to the topography of the position PP, typically, the upward direction vertical to the moving direction of the player character PC). The gravitational vector data De represents a gravitational vector Vg, which represents a gravitational direction in the game field GF at the position PP of the player character PC. The previous gravitational vector data Df represents a gravitational vector Vgo substituted (as described later in detail) as representing a gravitational vector Vg used in the immediately previous processing. The side entrance state flag data Dg represents a state of a side entrance state flag F, which represents whether or not the player character PC is in the side entrance state. The side entrance state is a state where the moving direction of the player character PC is maintained as described above; for example, a state where the player character PC enters the game field GF from the top surface to the side surface and moves toward the bottom surface.

The operation vector data Dh represents the direction or amount input by the player. For example, when the moving direction and the moving speed of the player character PC are instructed by the inclination direction and the inclination amount (inclination angle) of the stick 78a, an operation vector Vs is calculated in accordance with the inclination direction and the inclination amount of the stick 78a based on the key data Da. Data representing the operation vector Vs is stored in the operation vector data Dh. The operation vector Vs is specifically a two-dimensional vector represented by two values of an inclination amount in the upward-downward direction and an inclination amount in the leftward-rightward direction. The moving vector data Di represents the direction and the speed at which the player character PC moves in the virtual game space. For example, a moving vector Vm representing the direction and the speed at which the player character PC moves in the virtual game space is calculated in accordance with the operation vector Vs, and data representing the moving vector Vm is stored in the moving vector data Di.

The image data Dj includes player character image data Dj1, and topography image data Dj2 and the like. The player character image data Dj1 is data for locating the player character PC at the position PP in the virtual game space and generating a game image. The topography image data Dj2 is data for locating the game field GF in the virtual game space and generating a game image.

Figure 18:
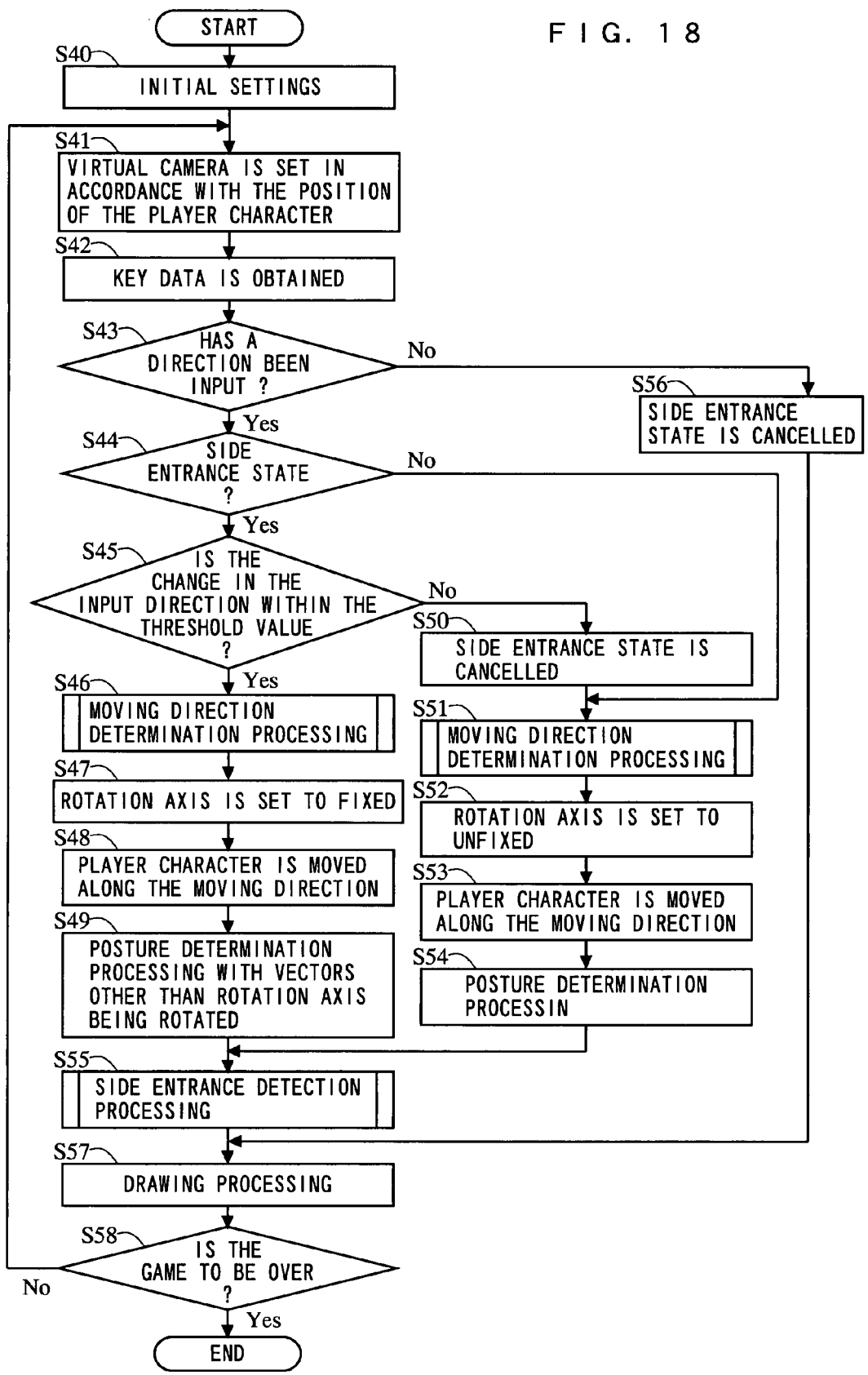
FIG. 18 is a flowchart illustrating a flow of game processing executed by the game apparatus main body 5.
Figure 19:
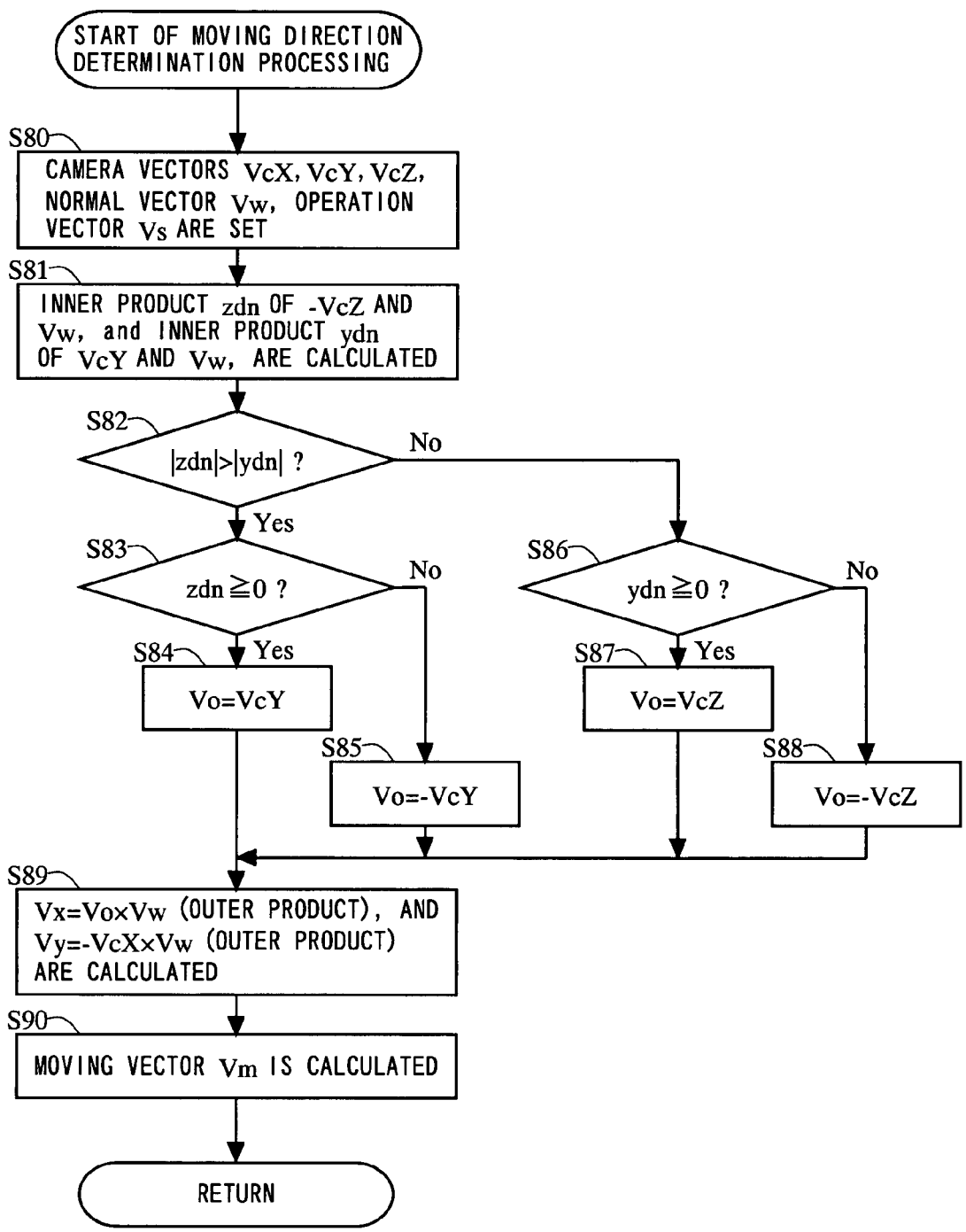
FIG. 19 illustrates a sub routine showing moving direction determination processing in steps 46 and 51 in FIG. 18 in detail.
Figure 20:
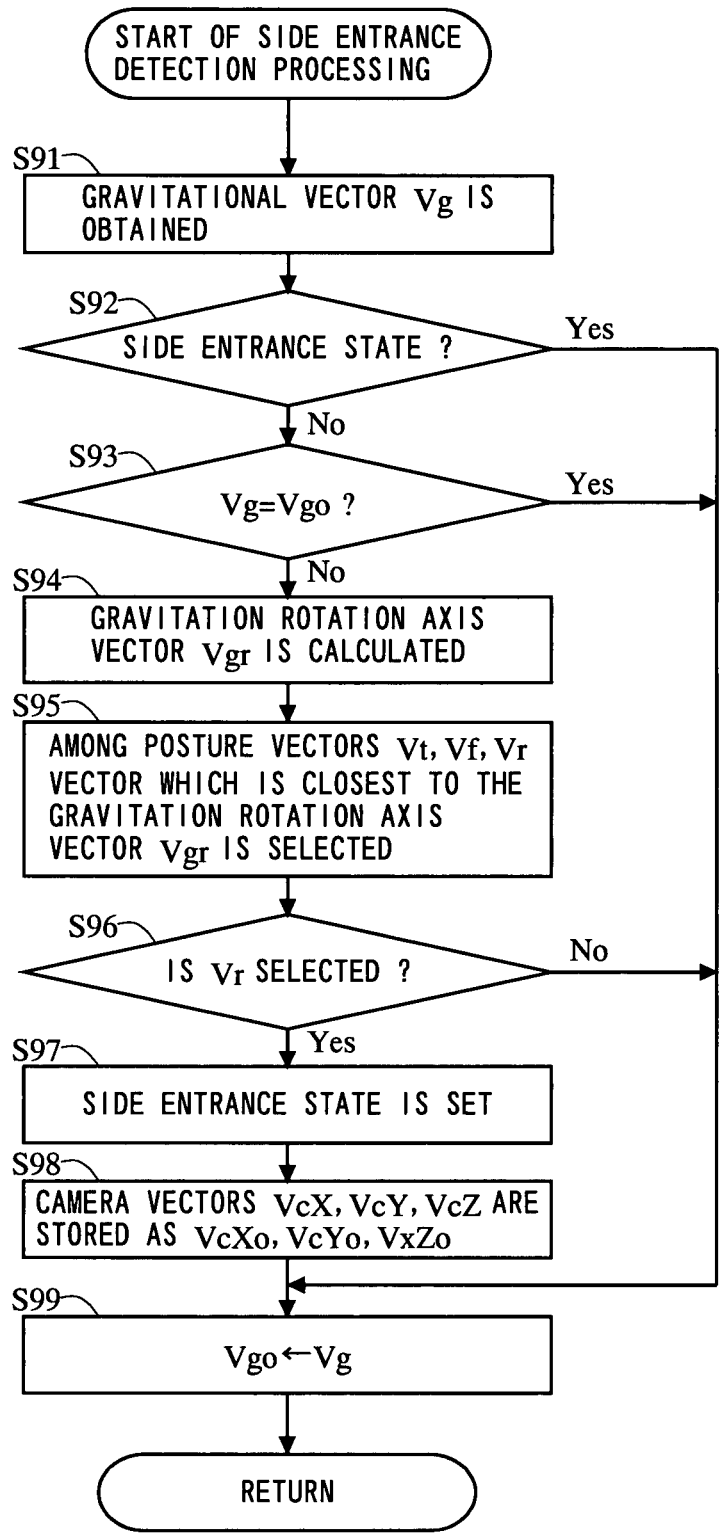
FIG. 20 illustrates a sub routine showing side entrance detection processing in step 55 in FIG. 18 in detail.

Now, with reference to FIG. 18 through FIG. 20, the game processing executed by the game apparatus main body 5 will be described in detail. FIG. 18 is a flowchart illustrating the game processing executed by the game apparatus main body 5. FIG. 19 illustrates a sub routine showing moving direction determination processing in steps 46 and 51 in FIG. 18 in detail. FIG. 20 illustrates a sub routine showing side entrance detection processing in step 55 in FIG. 18 in detail. With the flowcharts in FIG. 18 through FIG. 20, processing of moving the player character PC in accordance with the operation by the player on the stick 78a will be specifically described, among various game processing executed by the game apparatus main body 5. Other game processing not directly relevant to the present invention will not be described in detail. In FIG. 18 through FIG. 20, "steps" executed by the CPU 10 will be referred to simply as "S".

When the power of the game apparatus main body 5 is turned on, the CPU 10 of the game apparatus main body 5 executes a start program stored on the boot ROM (e.g., ROM/RTC 13) to initialize the units such as the main memory and the like. The game program stored on the optical disc 4 is read into the main memory, and the CPU 10 starts executing the game program. The flowcharts in FIG. 18 through FIG. 20 illustrate the game processing after the above processing is completed.

As shown in FIG. 18, the CPU 10 performs initial settings of the game processing (step 40) and advances the processing to the next step. In the initial settings in step 40, a game field object is located in a three-dimensional space coordinate system to construct the game field GF. The game field GF has a three-dimensional shape as described above, and the above-described gravity is set with respect to each of the points on the outer circumferential surface of the three-dimensional shape. The gravity at each point is, for example, set toward the center of the three-dimensional shape. The player character PC and other objects are located at predetermined positions on the outer circumferential surface of the game field GF, and data representing the position PP and the posture of the player character PC is stored in the player character data Db. The virtual camera C is located at a predetermined initial position with respect to the game field GF accommodating the player character PC and the like to display the game image on the monitor 2, and data representing the position and a camera vector of the virtual camera C is stored in the virtual camera data Dc. The CPU 10 also initializes the game parameters (for example, initializes the game parameters excluding the above-described parameters to 0).

Then, the CPU 10 sets the virtual camera C in accordance with the position PP of the player character PC (step 41), and advance the processing to the next step. More specifically, the CPU 10 appropriately sets the camera position data Dc1 and the camera vector data Dc2. For example, the CPU 10 locates the virtual camera C with respect to the game field GF accommodating the player character PC and the like, such that at least the player character PC is in an imaging range (for example, at the center of the imaging range) and displays the game image on the monitor 2. Then, the CPU 10 stores data representing the position and the camera vector of the virtual camera C in the virtual camera data Dc. In this embodiment, in step 41, the position of the virtual camera C is set such that the virtual camera C always follows the movement of the player character PC (see FIG. 11). In step 41, the virtual camera C is set so as to be rotated gradually frame by frame until being rotated by 180 degrees around the viewing direction, if the position PP of the player character PC or the like fulfills a predetermined condition (see FIG. 15). In this manner, the position and the posture of the virtual camera C are set such that the player character PC is included in the view volume of the virtual camera C and thus the player character PC is displayed on the monitor 2.

Next, the CPU 10 obtains sub key data (step 42) and advances the processing to the next step. For example, the CPU 10 uses the key data included in the latest operation information received from the core unit 70 to update the key data Da. Specifically, the CPU 10 uses the sub key data (especially the data representing the operation state on the stick 78a) included in the latest operation information received from the core unit 70 to update the key data Da. The sub key data obtained in step 42 is stored in the key data Da as the latest data. The sub key data which was stored in the key data Da as the latest data before the execution of step 42 is treated as the previous data and continuously stored in the key data Da. Thus, in the key data Da, the sub key data obtained in at least two game processing cycles is stored.

Next, the CPU 10 refers to the key data Da to determine whether or not the player has input a direction (step 43). For example, when the sub key data stored in the key data Da indicates that the stick 78a is inclined in some direction, the CPU 10 determines that the player has input a direction. By contrast, when the sub key data stored in the key data Da indicates that the stick 78a is in a neutral state without being inclined in any direction, the CPU 10 determines that the player has not input a direction. When the player has input a direction, the CPU 10 advances the processing to step 44. When the player has not input a direction, the CPU 10 cancels the side entrance state and advances the processing to step 57. Specifically, the CPU 10 sets the side entrance state flag F stored in the side entrance state flag data Dg to OFF.

In step 44, the CPU 10 determines whether or not the player character PC is in the side entrance state. Specifically, the CPU 10 refers to the side entrance state flag data Dg. When the side entrance state flag F is ON, the CPU 10 determines that the player character PC is in the side entrance state. When the player character PC is in the side entrance state, the CPU advances the processing to step 45. By contrast, when the player character PC is not in the side entrance state, the CPU advances the processing to step 51.

In step 45, the CPU 10 determines whether or not a change in the direction input by the player is within a threshold value. When the change in the direction input by the player is within the threshold value, the CPU 10 advances the processing to step 46. By contrast, when the change in the direction input by the player exceeds the threshold value, the CPU 10 advances the processing to step 50. For example, in step 45, the inclination state of the stick 78a (for example, the inclination direction or the inclination amount) represented by the latest sub key data stored in the key data Da is compared with the inclination state of the stick 78a represented by the previous sub key data. There is provided a threshold value for determining whether or not the difference between the inclination states is a level at which the direction input by the player is changed. When the difference is within the threshold value, it is recognized that the direction is not changed.

In step 50, the CPU 10 cancels the side entrance state and advances the processing to step 51. Specifically, the CPU 10 sets the side entrance state flag F stored in the side entrance state flag data Dg to OFF. The processing in step 50 is executed when the player character PC is in the side entrance state (Yes in step 44) and further, the change in the direction exceeds the threshold value (No in step 45). Even if the player character PC is in the side entrance state, the side entrance state is cancelled if the direction input by the player is changed.

When the player character PC is not in the side entrance state (No in step 44 or No in step 45), the processing in step 51 is executed. In step 51, the CPU 10 determines the moving direction of the player character PC. Hereinafter, with reference to FIG. 19, the moving direction determination processing will be described.

As shown in FIG. 19, the CPU 10 sets the camera vectors VcX, VcY and VcZ, the normal vector Vw, and the operation vector Vs (step 80), and advances the processing to the next step.

With reference to FIG. 21 and FIG. 22, an example of setting the camera vectors VcX, VcY and VcZ, the normal vector Vw, and the operation vector Vs in step 80 will be described. As described later in more detail, the moving direction determination processing is executed both when the player character PC is not in the side entrance state and when the player character PC is in the side entrance state. However, different camera vectors are used for determining the moving direction in these cases. When the player character PC is not in the side entrance state, the CPU 10 sets, in step 80, the camera vectors VcX, VcY and VcZ (i.e., the camera vectors stored in the camera vector data Dc2) set in step 41 with no alteration, as parameters to be used in the following processing. By contrast, when player character PC is in the side entrance state, the CPU 10 sets camera vectors VcXo, VcYo and VcZo stored in the camera vector data at entrance Dc3 as substitutes of the camera vectors VcX, VcY and VcZ.

The CPU 10 refers to the player character position data Db1 to calculate the normal vector Vw in the game field GF at the position PP (vector representing the upward direction vertical to the topography of the position PP, typically, the upward direction vertical to the moving direction of the player character PC (the moving vector Vm)). The CPU 10 then stores data representing the normal vector Vw in the normal vector data Dd. The CPU 10 also calculates the operation vector Vs using the inclination direction and the inclination amount of the stick 78a represented by the latest sub key data stored in the key data Da. The CPU 10 then stores data representing the operation vector Vs in the operation vector data Di. Optionally, the CPU 10 may store, in the normal vector data Dd, a vector obtained by inverting the gravitational vector at the position PP (anti-gravitational vector), or a vector calculated by appropriately adjusting two vectors of the gravitational vector and the normal vector, instead of the normal vector Vw. In this way also, the moving direction can be determined.

Returning to FIG. 19, after the processing in step 80, the CPU 10 calculates inner products zdn and ydn (step 81) and advances the processing to the next step. Specifically, the CPU 10 uses the camera vectors VcY and VcZ set in step 80 and the normal vector Vw to calculate an inner product of −VcZ and Vw as the inner product zdn, and an inner product of VcY and Vw as the inner product ydn. Namely, the inner product zdn is a parameter representing a counter-viewing direction (−VcZ direction) component of the normal vector Vw in the camera coordinate system. The inner product ydn is a parameter representing an upper direction (VcY direction) component of the normal vector Vw in the camera coordinate system.

Next, the CPU 10 determines whether or not the absolute value of the inner product zdn is larger than the absolute value of the inner product ydn (step 82). When |zdn|>|ydn|, the CPU 10 advances the processing to step 83. By contrast, when |zdn|≤|ydn|, the CPU advances the processing to step 86. In step 82, it is determined whether the direction of the normal vector Vw is closer to the viewing direction or to the upward-downward direction in the camera coordinate system. Namely, in step 82, it is determined, when the player character PC is standing on the game field GF, whether the virtual camera C is taking an image of the player character PC from a position close to the exactly upward direction with respect to the player character PC or from a position close to the lateral direction with respect to the player character PC. When the direction of the normal vector Vw is closer to the viewing direction in the camera coordinate system, the CPU 10 advances the processing to step 83. When the direction of the normal vector Vw is closer to the upward-downward direction in the camera coordinate system, the CPU 10 advances the processing to step 86.

In step 83, the CPU 10 determines whether or not the inner product zdn is 0 or greater. When zdn≥0, the CPU 10 sets a vector Vo as Vo=VcY (step 84) and advances the processing to step 89. By contrast, when zdn<0, the CPU 10 sets a vector Vo as Vo=−VcY (step 85) and advances the processing to step 89.

In step 86, the CPU 10 determines whether or not the inner product ydn is 0 or greater. When ydn≥0, the CPU 10 sets a vector Vo as Vo=VcZ (step 87) and advances the processing to step 89. By contrast, when ydn<0, the CPU 10 sets a vector Vo as Vo=−VcZ (step 88) and advances the processing to step 89.

In step 89, the CPU 10 calculates directional vectors Vx and Vy and advances the processing to the next step. As shown in FIG. 21 and FIG. 22, the direction vector Vx is a direction parameter representing a direction in the virtual game space corresponding to the operation of inclining the stick 78a rightward (direction Sr in FIG. 12 and the like) (specifically, a direction parameter representing the moving direction of the player character PC). The direction vector Vy is a direction parameter representing a direction in the virtual game space corresponding to the operation of inclining the stick 78a upward (direction Su in FIG. 12 and the like). The CPU 10 calculates the vector Vx as an outer product of the vector Vo and the normal vector Vw, i.e., $$Vx = Vo \times Vw.$$

The CPU 10 calculates the vector Vy as an outer product of the counter-direction vector of VcX (−VcX) and the normal vector Vw, i.e., $$Vy = -VcX \times Vw.$$

Next, the CPU 10 calculates the moving vector Vm of the player character PC to update the moving vector data Di (step 90), and terminates the processing of this sub routine. For example, the CPU 10 calculates the moving vector Vm by:

$$Vm = Vx \cdot Vsx + Vy \cdot Vsy.$$

As shown in FIG. 21 and FIG. 22, Vsx represents an x direction component of the operation vector Vs (the direction of inclining the stick 78a rightward), and Vs represents a y direction component of the operation vector Vs (the direction of inclining the stick 78a upward, perpendicular to the x direction). Namely, the operation vector Vs is representing the direction input by the player is a parameter based on the two axial directions (x direction and y direction) perpendicular to each other. The moving vector Vm is calculated by associating the direction vectors Vx and Vy to these two axial directions, respectively.

Now, the fundamental principle of the moving direction determination processing described above will be described. In the above-described processing, a direction in the virtual game space corresponding to the operation vector Vs (the moving vector Vm) is obtained using an outer product of any two of the three camera vectors VcX, VcY and VcZ perpendicular to one another and the normal vector Vw necessarily perpendicular to the moving direction. As shown in FIG. 21 and FIG. 22, the above-described processing is made upon the premise that the normal direction (or the gravitational direction) of the game field GF is set in the upward-downward direction or the forward-rearward direction with respect to the display screen; i.e., the direction of the normal vector Vw is parallel to the VcY-VcZ plane in the camera coordinate system. Accordingly, in the displayed game image, the direction vector Vy, which is in the upward direction along the game field GF from the position PP, is perpendicular to the normal vector Vw and the camera vector VcX. Namely, the direction vector Vy is obtained by an outer product of the counter-direction vector of the camera vector VcX (−VcX) and the normal vector Vw.

In the displayed game image, the direction vector Vx, which is in the rightward direction along the game field GF from the position PP, is perpendicular to the normal vector Vw and the camera vector VcY or VcZ. However, the positional relationship between the normal vector Vw and the camera coordinate system changes as, for example, the virtual camera C moves, upon the premise that the direction of the normal vector Vw is parallel to the VcY-VcZ plane of the camera coordinate system. Namely, the positional relationship between the camera vector VcY, VcZ and the normal vector Vw changes in accordance with the movement of the virtual camera C or the change in the imaging angle of the virtual camera C. In this embodiment, one of the camera vectors VcY and VcZ, which has a larger difference from the direction of the normal vector Vw (producing a smaller inner product with the normal vector Vw) is selected, and the outer product of the selected vector (vector Vo) and the normal vector Vw is used for obtaining the direction vector Vx. The positive or negative sign of the camera vectors VcX, VcY and VcZ when the direction vectors Vx and Vy are obtained are adjustable for obtaining the direction vectors Vx and Vy perpendicular to a desired direction by the outer product. For example, the sign of one of the camera vectors VcY and VcZ, the outer product of which with Vw has a smaller absolute value, is inverted for adjustment, in accordance with whether or not the inner product is positive or negative.

As described above, in this embodiment, an inner product and an outer product of the camera vectors VcX, VcY and VcZ with the normal vector Vw are used to calculate a reference direction in the virtual game space (the direction vectors Vx and Vy) in accordance with the reference directions (x and y) for the direction input made by the player. Based on the obtained reference direction, the moving vector Vm in accordance with the direction input by the player is calculated. Thus, the moving direction intuitively associated with the direction input by the player is calculated. As a result, the player can input directions intuitively even in a virtual game space using a game field for which the gravitational direction (normal direction) is set in various directions, without being confused. Even when the virtual camera is rotated when the predetermined condition is fulfilled in the above-described virtual game space environment, the player can input directions intuitively without being confused.

In the above-described moving direction determination processing, among the camera vectors VcX, VcY and VcZ, either the camera vector VcY or VcZ and the camera vector VcX are used to calculate the two direction vectors Vx and Vy. The camera vectors may be selected in any other form. For example, in the above-described moving direction determination processing, the camera vector VcX is indispensably used because there is a premise that the direction of the normal vector Vw is parallel to the VcY-VcZ plane in the camera coordinate system. Another camera vector may be indispensably used depending on the positional relationship between the camera coordinate system and the normal vector Vw. Specifically, there may be a premise that the gravitational direction (normal direction) of the game field GF is set in the leftward-rightward direction or the forward-rearward direction with respect to the display screen; i.e., the direction of the normal vector Vw is parallel to the VcX-VcZ plane in the camera coordinate system. In this case, the direction vectors Vx and Vy can be calculated using an outer product of either the camera vector VcX or VcZ and the normal vector Vw, and an outer product of the camera vector VcY and the normal vector Vw.

Figure 23:
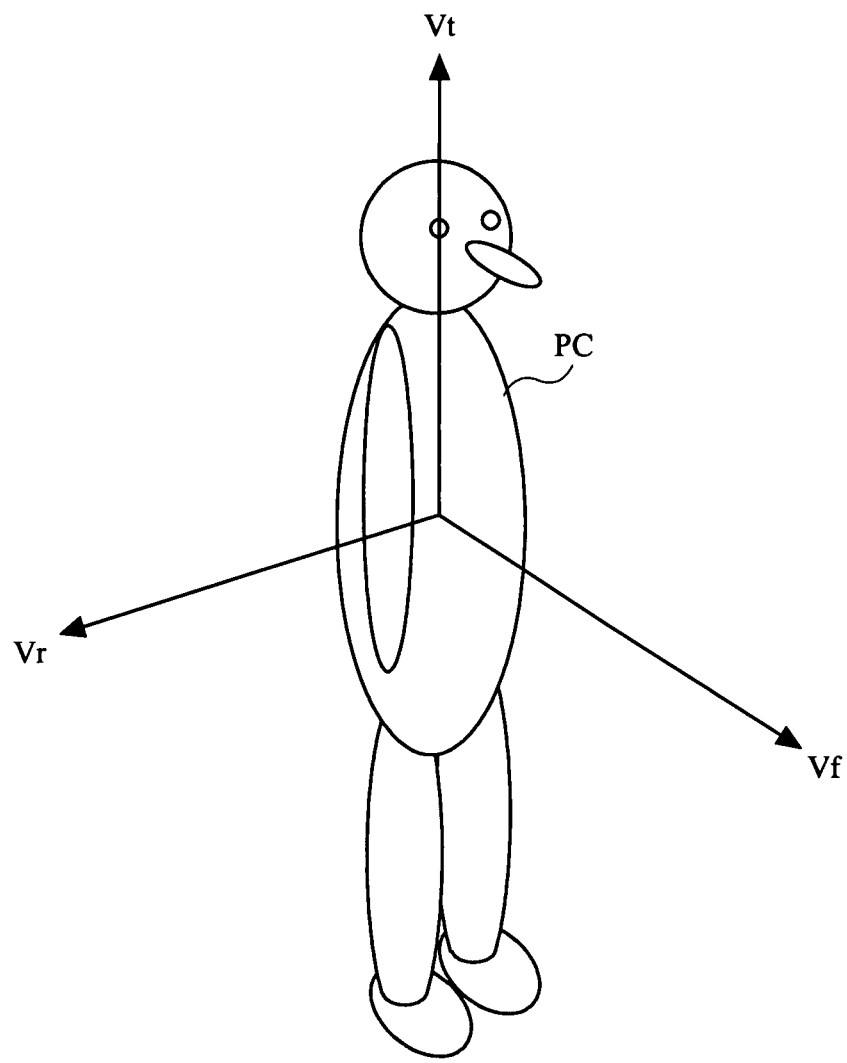
FIG. 23 shows an example of vectors Vt, Vf and Vr which are set for the player character PC.

Returning to FIG. 18, after the moving direction determination processing in step 51, the CPU 10 sets a rotation axis along which the player character PC changes the posture thereof to unfixed (step 52). Based on the moving vector Vm calculated in step 51, the CPU 10 moves the player character PC (step 53), determines the posture of the player character PC (step 54), and advances the processing to step 55. For example, the CPU 10 moves the player character PC based on the moving vector Vm on the game field GF to calculate a new position PP, and thus updates the player character position data Db1. In accordance with the newly calculated position PP and the input from the player, the CPU 10 determines the posture of the player character PC and thus updates the posture vector data Db2. As shown in FIG. 23, vectors Vt, Vf and Vr are set for the player character PC as parameters representing the posture thereof. Specifically, the posture of the player character PC is defined by the upward vector Vt representing the upward direction (standing direction) with respect to the player character PC, the forward vector Vf representing the forward direction with respect to the player character PC, and the lateral direction vector Vr representing the lateral direction with respect to the player character PC. In step 54, in accordance with the newly calculated position PP and the input from the player, the upward vector Vt, the forward vector Vf and the lateral direction vector Vr are determined, and thus the posture vector data Db2 is updated.

When the player character PC is in the side entrance state (Yes in step 44) and the change in the direction input by the player is within the threshold value (i.e., the direction input by the player is not changed) (Yes in step 45), the CPU 10 executes the processing of determining the moving direction of the player character PC (step 46) and advances the processing to the next step. The moving direction determination processing executed in step 46 is substantially the same as the moving direction determination processing executed in step 51 described above except for the following point, and will not be described in detail. In the moving direction determination processing executed in step 46, the player character PC is in the side entrance state. Therefore, the camera vectors VcXo, VcYo and VcZo stored in the camera vector data at entrance Dc3 are treated as the camera vectors VcX, VcY and VcZ, respectively.

After the moving direction determination processing in step 46, the CPU 10 sets the rotation axis along which the player character PC changes the posture thereof to fixed (step 47). Based on the moving vector Vm calculated in step 46, the CPU 10 moves the player character PC (step 48), determines the posture of the player character PC (step 49), and advances the processing to step 55.

For example, in step 48, the CPU 10 moves the player character PC based on the moving vector Vm on the game field GF to calculate a new position PP, and thus updates the player character position data Db1. The moving direction of the player character PC is calculated based on the camera vector when the player character PC has transferred to the side entrance state. Accordingly, even if the virtual camera C is moved or rotated during the period of the side entrance state, the moving direction of the player character PC is calculated with an assumption that the virtual camera C is not moved or rotated.

In step 49, in accordance with the newly calculated position PP and the input from the player, the CPU 10 determines the posture of the player character PC and thus updates the posture vector data Db2. In the posture determination processing in step 49, when the posture of the player character PC is changed, the direction of the lateral direction vector Vr is fixed while the directions of the upward vector Vt and the forward vector Vf are rotated. As described later in more detail, the player character PC is set to the side entrance state when the gravitational direction acting on the player character PC is changed and the direction input by the player is not changed. As described above with reference to FIG. 11 and the like, the posture of the player character PC is changed only by the upward vector Vt and the forward vector Vf in such an environment. The lateral direction vector Vr with respect to the player character PC is not changed. Accordingly, in the posture determination processing in step 49, the posture change of the player character PC when the gravitational direction is changed is controlled by fixing one of the upward vector Vt, the forward vector Vf and the lateral direction vector Vr which determine the posture of the player character PC (i.e., the lateral direction vector Vr).

In step 55, the CPU 10 executes side entrance detection processing and advances the processing to step 57. Hereinafter, with reference to FIG. 20, the side entrance detection processing will be described in detail.

As shown in FIG. 20, the CPU 10 obtains the gravitational vector Vg set at the current position PP to update the gravitational vector data De (step 91) and advances the processing to the next step. As described above, the gravity of the virtual game space is set in the game field GF toward the center thereof. In step 91, the gravitational vector Vg representing the gravitational direction set at the position PP (i.e., the direction of a virtual gravity acting on the player character PC) is obtained.

Next, the CPU 10 refers to the side entrance state flag data Dg to determine whether or not the player character PC is in the side entrance state (step 92). When the player character PC is not in the side entrance state, the CPU 10 advances the processing to step 93. By contrast, when the player character PC is in the side entrance state, the CPU 10 advances the processing to step 99.

In step 93, the CPU 10 determines whether or not the gravitational vector Vg stored in the gravitational vector data De is equal to the gravitational vector Vgo stored in the previous gravitational vector data Df. When Vg≠Vgo, the CPU 10 advances the processing to step 94. By contrast, when Vg=Vgo, the CPU 10 advances the processing to step 99. The gravitational vector Vgo stored in the previous gravitational vector data Df is the gravitational vector Vg obtained in the immediately previous processing. In step 93, it is detected whether or not the direction of the gravity acting on the player character PC is changed.

In step 94, the CPU 10 calculates a gravitation rotation axis vector Vgr and advances the processing to the next step. The gravitation rotation axis vector Vgr represents a rotation axis along which the gravitational direction changes, and is obtained by calculating a vector perpendicular to the gravitational vector Vg and the gravitational vector Vgo.

Next, the CPU 10 selects one of the upward vector Vt, the forward vector Vf and the lateral direction vector Vr with respect to the player character PC, which represents a direction closest to the rotation axis direction represented by the gravitation rotation axis vector Vgr (step 95), and determines whether or not the selected vector is the lateral direction vector Vr (step 96). When the selected vector is the lateral direction vector Vr, the CPU 10 advances the processing to step 97. By contrast, when the selected vector is the upward vector Vt or the forward vector Vf, the CPU 10 advances the processing to step 99.

In step 97, the CPU 10 sets the player character PC to the side entrance state and advances the processing to the next step. Specifically, the CPU 10 sets the side entrance state flag F stored in the side entrance state flag data Dg to ON.

Then, the CPU 10 refers to the camera vectors VcX, VcY and VcZ stored in the camera vector data Dc2 to substitute these values to the camera vectors VcXo, VcYo and VcZo respectively and store the values in the camera vector data at entrance Dc3 (step 98). Then, the CPU 10 advances the processing to step 99.

In step 99, the CPU 10 refers to the gravitational vector Vg stored in the gravitational vector data De to substitute the value to the gravitational vector Vgo and store the value in the previous gravitational vector data Df. Then, the CPU 10 terminates the processing of this sub routine.

Returning to FIG. 18, after the side entrance state detection processing in step 55, the CPU 10 executes drawing processing (step 57) and advances the processing to the next step. Specifically, the CPU 10 creates a game image representing the game field GF, the player character PC and the like as seen from the virtual camera C set in step 41, and displays the game image on the monitor 2.

Next, the CPU 10 determines whether or not to terminate the game (step 58). A condition for terminating the game is, for example, that a condition for terminating the game is fulfilled, or that the player has made an operation to terminate the game. When the game is not to be terminated, the CPU 10 returns the processing to step 41 to repeat the processing. When the game is to be terminated, the CPU 10 terminate the processing in the flowchart.

Now, the moving direction of the player character PC which is set when the player character PC is in the side entrance state by the above-described processing will be described. As is clear from the above-described flow, in a period after the player character PC is transferred to the side entrance state until the direction input by the player is changed, the moving direction of the player character PC is determined by the processing in step 46. In the moving direction determination processing in step 46, the moving vector Vm is calculated based on the camera vectors VcX, VcY and VcZ at the time when the player character PC is set to the side entrance state. Namely, even if the virtual camera C is moved or rotated during the above-mentioned period, the moving vector Vm is calculated with an assumption that the virtual camera C is not moved or rotated. Accordingly, when the virtual camera C is rotated around the viewing direction, the direction input by the player may be temporarily opposite to the moving direction of the player character PC.

For example, as described above with reference to FIG. 14 through FIG. 16, it is assumed that the virtual camera Cc is rotated by 180 degrees during the above-mentioned period. In this case, the game image on the monitor 2 is displayed as inverted upside down in accordance with the rotation of the virtual camera C (for example, the game image in the FIG. 14 is changed to the game image in the FIG. 16). During the above-mentioned period, when the stick 78a is inclined downward (direction Sd) after the rotation of the virtual camera C, the player character PC is moved away from the virtual camera C as shown in FIG. 16 (direction Md in the upper set of arrows). In this manner, when the player inclines the stick 78a downward, the player character PC is moved upward in the displayed area. Thus, the direction input by the player is opposite to the moving direction of the player character PC.

When the stick 78a is inclined downward (direction Sd) before the rotation of the virtual camera C, the player character PC moves away from the virtual camera C, i.e., in a direction receding deeper into the virtual game space in the game image (direction Md) as shown in FIG. 14. When the player maintains the direction (when the player keeps on inputting direction Sd) and the virtual camera C is rotated (the state shown in FIG. 16) also, the player character PC moves away from the virtual camera C, i.e., in a direction receding deeper into the virtual game space in the game image (direction Md in the upper set of arrows). Thus, when the player keeps on inputting the same direction during the above-mentioned period, the moving direction of the player character PC is maintained without being changed even if the virtual camera C is rotated during the above-mentioned period. When the player wishes to keep on moving the player character PC in the same direction during the above-mentioned period, the player can continue the same operation regardless of the state of the virtual camera C. This way of operation is very easy to understand for the player.

When the player wishes to change the moving direction of the player character PC or to stop moving the player character PC, the player can change the inclination state of the stick 78a. Then, the side entrance state is cancelled, and the moving direction is changed to the moving direction based on the current position and the current imaging direction of the virtual camera C. For example, when the inclination state of the stick 78a is changed after the virtual camera C is rotated (the state shown in FIG. 16), the moving direction of the player character PC is changed to the direction intuitively associated with the direction input by the player (direction Mu, Md, Ml or Mr in the lower set of arrows). When the player makes an operation to change the moving direction of the player character PC in this manner, the player character PC is moved to a direction intuitively perceivable in accordance with the input direction.

As described above, the apparatus for executing the image processing program according to this embodiment allows intuitive direction input operations in a virtual game space using a game field in which gravitational direction (normal direction) is set in various directions, without confusing the player. Even when the virtual camera is rotated when a predetermined condition is fulfilled in such a virtual game space environment, the apparatus allows intuitive direction input operations without confusing the player.

In the above description, the moving vector Vm is calculated using the normal vector Vw of the game field GF at the position PP and the camera vectors VcX, VcY and VcZ. The normal vector Vw may be calculated using another vector and the camera vectors VcX, VcY and VcZ. For example, a counter-direction vector to the gravitational vector Vg of the game field GF at the position PP (i.e., the anti-gravitational vector) may be used to calculated the moving vector Vm in substantially the same manner. The moving vector Vm may be calculated by appropriately adjusting the normal vector Vw and the anti-gravitational vector. The normal vector Vw and the anti-gravitational vector both represent the exactly upward direction with respect to the player character PC, and is a parameter usable as a posture control vector for determining the posture (standing direction) of the player character PC, which is defined in accordance with the position PP in the virtual game space. Accordingly, such an exactly upward vector with respect to the player character PC according to the present invention may be determined by any other vector which represents the standing direction of the player character PC. The normal vector Vw and the anti-gravitational vector are examples of the exactly upward vector according to the present invention.

In the above description, the player character PC is moved in accordance with the input operation on the stick 78a provided in the sub unit 76. Another operation section may be used to move the player character PC. For example, the player character PC may be moved in accordance with the input operation on the cross key 72a provided in the core unit 70. In this case, the present invention can be realized in an embodiment in which the controller 7 formed of only the core unit 70 provides operation information to the game apparatus main body 5. Alternatively, another operation section capable of inputting directions may be mounted on the controller 7 and the player character PC may be moved in accordance with the input operation on such an operation section.

In the above description, the present invention is applied to the installation type game apparatus main body 5 which executes processing in accordance with input operations made on the core unit 70 or the sub unit 76. The present invention is also applicable to a mobile game apparatus. For example, an object displayed on a display device may be moved using an operation section capable of inputting directions which is mounted on the main body of the mobile game apparatus. The present invention is preferably applicable to such a mobile game apparatus or the like for playing a game.

In the above description, the present invention is applied to an installation type or mobile game apparatus. The present invention is applicable to general information processing apparatuses such as personal computers operable through an input device, or mobile information processing apparatuses. For example, with the former information processing apparatus, various processing can be executed based on an operation made on the input device; for example, an object or the like displayed by the information processing apparatus can be moved in accordance with the key data which is output from an operation section of the input device. The latter information processing apparatus may be any information processing apparatus having an operation section in a main body thereof and capable of executing processing in accordance with the key data which is output from the operation section. Thus, the present invention is applicable to general personal computers, mobile phones, PDAs (Personal Digital Assistance) and other devices.

An example of the latter information processing apparatus is a mobile phone including a communication section capable of wirelessly communicating with another phone. In this case, the main body of the mobile phone has various operation buttons mounted thereon. An object displayed on a display screen of the mobile phone is controlled to be moved using an output value from the operation buttons. Thus, the present invention is preferably applicable to such a mobile phone or the like for playing a game.

In the above description, the core unit 70 and the sub unit 76 are both connected with the game apparatus main body 5 via wireless communication. Alternatively, the core unit 70 or the sub unit 76 may be electrically connected with the game apparatus main body 5 via a cable. In this case, the cable connected to the core unit 70 or the sub unit 76 is connected to a connection terminal of the game apparatus main body 5.

The shape of the core unit 70 and the sub unit 76, and the shape, number and positions of the operation sections 72 provided thereon described above are merely illustrative. The present invention can be realized with other shapes, numbers and positions.

The image processing program or the game program according to the present invention may be supplied to the game apparatus main body 5 via a wired or wireless communication line, as well as an external storage medium such as the optical disc 4 or the like. The image processing program or the game program may be stored on an nonvolatile memory device inside the game apparatus main body 5 in advance. An information storage medium for storing the image processing program or the game program may be a nonvolatile semiconductor memory, as well as any of CD-ROMs, DVDs, or similar optical disc storage mediums.

For inputting a direction instructed by the player, the direction input by the player may be calculated using data obtained from the acceleration sensors 701 and 761 and the imaging information calculation section 74. For example, data obtained from the acceleration sensors 701 and 761 and the imaging information calculation section 74 can be used to calculate the direction in which the core unit 70 or the sub unit 76 is to be moved by the player, or the posture of the core unit 70 or the sub unit 76. The calculation results of the direction or posture can be used as the direction input by the player. In this case, a direction vector representing the direction input by the player may be calculated to be utilized, using the data from the acceleration sensors 701 and 761 and the imaging information calculation section 74, instead of the key data. Since the data obtained from the controller 7 is not a two-dimensional vector, the two-dimensional vector may be calculated by a predetermined calculation. Alternatively, the data from the acceleration sensors 701 and 761 and the imaging information calculation section 74 may be stored in the main memory without being changed, and the two-dimensional vector may be calculated and utilized when the moving vector Vm is calculated in step 90.

A storage medium having an image processing program stored thereon and an image processing apparatus according to the present invention can move an object displayed on a display device in a direction intuitively associated with the direction input by the player, and are useful as a program and an apparatus for executing processing of moving an object displayed on a display device in a direction input to an input device such as a game controller or the like.

While the invention has been described in detail, the foregoing description is in all aspects illustrative and not restrictive. It is understood that numerous other modifications and variations can be devised without departing from the scope of the invention.

What is claimed is:

1. A non-transitory computer readable storage medium comprising an image processing program executable by a computer of an image processing apparatus for displaying, on a display device, an operation target object in a virtual space as seen from a virtual camera, the image processing program causing the computer to:
    obtain direction data based on an input direction which is input by a user;
    set a position and a posture of the virtual camera in the virtual space;
    determine a moving direction of the operation target object in the virtual space using the direction data, the direction data being influenced by an exactly upward vector determined based on a direction of a virtual gravity acting on a position of the operation target object in the virtual space and/or a direction of normal of a virtual field at the position of the operation target object, and also being influenced by at least one camera vector among a plurality of camera vectors representing the posture of the virtual camera; and
    move the operation target object in the determined moving direction.

2. The non-transitory computer readable storage medium according to claim 1, wherein:
    the direction data represents the input direction based on two axial directions perpendicular to each other;
    the plurality of camera vectors include three camera vectors perpendicular to each other, which respectively represent a viewing direction of the virtual camera, a longitudinal direction of a displayed image as seen from the virtual camera, and a lateral direction of the displayed image; and
    a first camera vector and a second camera vector are selected from the three camera vectors to calculate a first vector perpendicular to the first camera vector and the exactly upward vector and a second vector perpendicular to the second camera vector and the exactly upward vector, and the moving direction is determined in accordance with the direction represented by the direction data by associating the first vector and the second vector to the two axial directions respectively.

3. The non-transitory computer readable storage medium according to claim 2, wherein the first vector is calculated by an outer product of the first camera vector and the exactly upward vector, and the second vector is calculated by an outer product of the second vector and the exactly upward vector.

4. The non-transitory computer readable storage medium according to claim 2, wherein either the camera vector representing the viewing direction or the camera vector representing the longitudinal direction is selected as the first vector, and the camera vector representing the lateral direction is selected as the second camera vector.

5. The non-transitory computer readable storage medium according to claim 4, wherein either the camera vector representing the viewing direction or the camera vector representing the longitudinal direction is selected as the first vector, using an inner product of the camera vector representing the viewing direction and the exactly upward vector, and also using an inner product of the camera vector representing the longitudinal direction and the exactly upward vector.

6. The non-transitory computer readable storage medium according to claim 5, wherein the inner products are compared, and either the camera vector representing the viewing direction or the camera vector representing the longitudinal direction, the inner product of which with the exactly upward vector has a smaller absolute value, is selected as the first camera vector.

7. The non-transitory computer readable storage medium according to claim 6, wherein either the camera vector representing the viewing direction or the camera vector representing the longitudinal direction is inverted, the inner product of which with the exactly upward vector has a smaller absolute value in accordance with whether the inner product having the smaller absolute value is positive or negative, and the inverted camera vector is selected as the first camera vector.

8. The non-transitory computer readable storage medium according to claim 2, wherein the first camera vector and the second camera vector is selected using an inner product of each of the three camera vectors and the exactly upward vector.

9. The non-transitory computer readable storage medium according to claim 1, wherein:
    the virtual camera is rotated when a predetermined condition is fulfilled; and
    the image processing program further causes the computer to:
        detect that the input direction which is input by the user is changed using the direction data; and
        determine the moving direction based on the camera vector before the rotation of the virtual camera, until a change of the input direction is detected after the rotation of the virtual camera.

10. The non-transitory computer readable storage medium according to claim 9, wherein:
    the determination made on the moving direction based on the camera vector is canceled before the rotation of the virtual camera when a change of the input direction is changed after the rotation of the virtual camera; and
    when a change of the input direction is detected after the rotation of the virtual camera, the moving direction is determined in accordance with the direction represented by the direction data after the input direction is changed, based on a camera vector representing the posture of the virtual camera after the rotation of the virtual camera.

11. The non-transitory computer readable storage medium according to claim 9, wherein the virtual camera is rotated around a viewing direction thereof when the predetermined condition is fulfilled.

12. The non-transitory computer readable storage medium according to claim 9, wherein:
    the image processing program further causes the computer to successively determine three posture vectors perpendicular to one another, which represent the posture of the operation target object, based on the exactly upward vector set at the position of the operation target object and also based on the determined moving direction; and
    when a direction of the exactly upward vector which is set at the position of the operation target object is changed before and after the operation target object is moved, the posture of the operation target object is determined by fixing a direction of one of the three posture vectors while changing directions of the other two posture vectors until a change of the input direction is detected.

13. The non-transitory computer readable storage medium according to claim 1, wherein:
in the virtual space, a three-dimensional virtual field in which the virtual gravity is set in different directions with respect to an outer circumferential surface thereof is set;
the moving direction of the operation target object is determined along the outer circumferential surface of the three-dimensional virtual field at the position of the operation target object; and
the operation target object is moved in the determined moving direction along the outer circumferential surface of the three-dimensional virtual field.

14. The non-transitory computer readable storage medium according to claim 13, wherein the virtual camera is set in accordance with the position of the operation target object, at a position and a posture at which the operation target object is encompassed in a view volume of the virtual camera and the operation target object is displayed on the display device.

15. The non-transitory computer readable storage medium according to claim 1, wherein
the direction of normal is a vector extending perpendicular from the virtual field where the operation target is positioned,
the direction of the virtual gravity is a vector extending in an exactly downward direction from the virtual field where the operation target is positioned, and
the exactly upward vector represents a posture control vector for controlling the posture of the operation target object in the virtual field at the position of the operation target object.

16. The non-transitory computer readable storage medium according to claim 1, wherein the virtual camera is rotated when the posture of the virtual camera with respect to the exactly upward vector satisfies a first condition.

17. The non-transitory computer readable storage medium according to claim 1, wherein the moving direction of the operation target changes when the posture of the virtual camera with respect to the exactly upward vector satisfies a first condition.

18. The non-transitory computer readable storage medium according to claim 1, wherein
the posture of the virtual camera changes when the exactly upward vector satisfies a first condition, and
the moving direction of the operation target is maintained until the posture of the virtual camera changes.

19. An image processing apparatus comprising at least one processor and for displaying, on a display device, an operation target object as seen from a virtual camera, the image processing apparatus configured to:
obtain direction data based on an input direction which is input by a user;
set a position and a posture of the virtual camera in a virtual space;
determine a moving direction of the operation target object in the virtual space using the direction data, the direction data being influenced by an exactly upward vector determined based on a direction of a virtual gravity acting on a position of the operation target object in the virtual space and/or a direction of normal of a virtual field at the position, and also being influenced by at least one camera vector among a plurality of camera vectors representing the posture of the virtual camera; and
move the operation target object in the determined moving direction.

20. The image processing apparatus according to claim 19, wherein:
the direction data represents the input direction based on two axial directions perpendicular to each other;
the plurality of camera vectors include three camera vectors perpendicular to each other, which respectively represent a viewing direction of the virtual camera, a longitudinal direction of a displayed image as seen from the virtual camera, and a lateral direction of the displayed image; and
the image processing apparatus further configured to select a first camera vector and a second camera vector from the three camera vectors to calculate a first vector perpendicular to the first camera vector and the exactly upward vector and a second vector perpendicular to the second camera vector and the exactly upward vector, and determine the moving direction in accordance with the direction represented by the direction data by associating the first vector and the second vector to the two axial directions respectively.

21. The image processing apparatus according to claim 19, wherein:
the virtual camera is rotated when a predetermined condition is fulfilled; and
the image processing further comprises:
detecting that the input direction which is input by the user is changed using the direction data; and
determining the moving direction based on the camera vector before the rotation of the virtual camera, until a change of the input direction after the rotation of the virtual camera is detected.

22. A method for displaying, on a display device, an operation target object in a virtual space as seen from a virtual camera, the method being executed using an information processing apparatus having one or more processors, the method comprising:
obtaining direction data based on an input direction which is input by a user;
setting a position and a posture of the virtual camera in the virtual space;
determining, using the one or more processors, a moving direction of the operation target object in the virtual space using the direction data, the direction data being influenced by an exactly upward vector determined based on a direction of a virtual gravity acting on a position of the operation target object in the virtual space and/or a direction of normal of a virtual field at the position of the operation target object, and also being influenced by at least one camera vector among a plurality of camera vectors representing the posture of the virtual camera; and
moving the operation target object in the determined moving direction.

23. An image processing system, comprising:
a display device configured to display image data; and
an image processing apparatus comprising at least one processor, the information processing apparatus coupled to the display device and configured to display, on the display device, an operation target object as seen from a virtual camera, the image processing apparatus configured to:
obtain direction data based on an input direction which is input by a user,
set a position and a posture of the virtual camera in a virtual space, determine a moving direction of the operation target object in the virtual space using the direction data, the direction data being influenced by an exactly upward vector determined based on a direction of a virtual gravity acting on a position of the operation target object in the virtual space and/or a direction of normal of a virtual field at the position, and also being influenced by at least one camera vector among a plurality of camera vectors representing the posture of the virtual camera, and move the operation target object in the determined moving direction.

24. An information processing system, comprising:
a processing system having at least one processor, the processing system configured to:
set an orientation of a virtual camera in a virtual space including both a position and a posture of the virtual camera,
determine a moving direction of a virtual object in the virtual space using direction data obtained from an input operation, the moving direction of the virtual object being influenced by the orientation of the virtual camera and a gravity vector based on a direction of a virtual gravity acting on a position of the virtual object in the virtual space, and
move the virtual object in accordance with the determined moving direction,
wherein the virtual camera is rotated when the orientation of the virtual camera with respect to the gravity vector satisfies a first condition.

25. The information processing system according to claim 24, wherein the virtual camera rotates 180° when the first condition is satisfied.

26. The information processing system according to claim 24, wherein the moving direction of the virtual object is maintained before the virtual camera is rotated.

27. The information processing system according to claim 26, wherein the moving direction changes based on the rotation of the virtual camera.

* * * * *